(12) United States Patent
Kikuchi

(10) Patent No.: US 8,265,489 B2
(45) Date of Patent: Sep. 11, 2012

(54) OPTICAL FIELD TRANSMITTER AND OPTICAL FIELD TRANSMISSION SYSTEM

(75) Inventor: Nobuhiko Kikuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 246 days.

(21) Appl. No.: 12/741,518

(22) PCT Filed: Oct. 30, 2008

(86) PCT No.: PCT/JP2008/070248
§ 371 (c)(1),
(2), (4) Date: May 5, 2010

(87) PCT Pub. No.: WO2009/060920
PCT Pub. Date: May 14, 2009

(65) Prior Publication Data
US 2010/0239267 A1    Sep. 23, 2010

(30) Foreign Application Priority Data

Nov. 9, 2007  (JP) ................................. 2007-291679

(51) Int. Cl.
*H04B 10/04* (2006.01)
(52) U.S. Cl. .......................... 398/189; 398/186; 398/188
(58) Field of Classification Search .................. 398/186, 398/188–191, 201
See application file for complete search history.

(56) References Cited

U.S. PATENT DOCUMENTS
7,398,022 B2 *   7/2008   Zitelli ........................... 398/183

FOREIGN PATENT DOCUMENTS
| JP | 2005-110266 | 4/2005 |
| JP | 2007-082094 | 3/2007 |
| WO | WO 2007/132503 | 11/2007 |

OTHER PUBLICATIONS

K. Sekine, et al., "Proposal and Demonstration of 10-Gsymbol/Sec 16-ary ( 40 Gbit/s) Optical Modulation/Demodulation Scheme", Central Research Lab., Hitachi, Ltd. European Conference on Optical Communication 2004.

R.A. Griffin, et al. "10 Gb/s Optical Differential Quadrature Phase Shift Key (DQPSK) Transmission Using GaAs/AlGaAs Integration", Bookham Technology Plc, Optical Fiber Conf. 2002.

(Continued)

*Primary Examiner* — Leslie Pascal
(74) *Attorney, Agent, or Firm* — Antonelli, Terry, Stout & Kraus, LLP.

(57) ABSTRACT

It is provided an optical field transmitter comprising a light source, a DA converter and an optical field modulator. The optical field transmitter modulates an information signal into an optical field signal. The information signal includes one of multilevel signals arranged irregularly on a complex plane and multilevel signals arranged by combining mutually different numbers of phase values in at least two amplitude values. The optical field transmitter further comprises a phase pre-accumulation circuit for outputting phase pre-accumulation complex information obtained by previously accumulating a phase component of the information signal at predetermined time intervals. The DA converter converts the information signal including the output phase pre-accumulation complex information into an analog signal, and inputs the converted analog signal to the optical field modulator. The optical field modulator modulates output light into the optical field signal by using the analog signal, and transmits the modulated optical field signal.

11 Claims, 13 Drawing Sheets

OTHER PUBLICATIONS

J. Hongou, et al., 1 Gsymbol/s, 64 QAM Coherent Optical Transmission Over 150 KM With a Spectral Efficiency of 3 Bit/s/Hz, Research Institute of Electrical Communication, Proc. Optical Fiber Communication Conference, Mar. 2007.

M.G. Taylor, Coherent Detection Method Using DSP to Demodulate Signal and for Subsequent Equalisation of Propagation Impairments, University College London, Dept. Electronic & Electrical Engineering, European Conference on Optical Communications 2003.

K.M. Aleong, "A Technique for Combing Equalization With Generalized Differential Detection", Dept. of Electrical Eng, Apr. 1993.

* cited by examiner

DEFINITIONS OF AMPLITUDE AND PHASE

FOUR-LEVEL PHASE MODULATION (QPSK)

SIXTEEN-LEVEL QUADRATURE AMPLITUDE MODULATION (16QAM)

SIXTEEN-LEVEL PHASE AND AMPLITUDE MODULATION (16APSK)

EIGHT-LEVEL PHASE AND AMPLITUDE MODULATION (8-APSK)
(CONVENTIONAL TECHNOLOGY)

OPTICAL MULTILEVEL SIGNAL RECEIVER FOR RECEIVING 8APSK SIGNAL
(CONVENTIONAL TECHNOLOGY)

TRANSMISSION OPTICAL FIELD
(EXAMPLE OF 16QAM)

TWO-DIMENSIONAL DISPLAY OF OUTPUTS (X,Y)
FROM DELAY DETECTOR ON (dI,dQ)

TWO-DIMENSIONAL DISPLAY OBTAINED
BY ACCUMULATING PHASE ANGLES Δφ OF FIG. 4B
AND SUBSTITUTING AMPLITUDE WITH r(n)

CASE WHERE NOISE IS ADDED IN FIG. 4C
TO OBTAIN DELAY AMOUNT OF OPTICAL
DELAY DETECTOR T=1.05/Rb

16QAM SIGNAL TO BE TRANSMITTED

PHASE ACCUMULATION SIGNAL OF FIG. 7A

QUADRATURE DELAY DETECTION
SIGNAL (dI,dQ) OF FIG. 7B

RECONSTRUCTION COMPLEX
INFORMATION SIGNAL

CASE WHERE NOISE IS ADDED IN
FIG. 7D TO OBTAIN DELAY AMOUNT OF
OPTICAL DELAY DETECTOR T=1.05/Rb

PROCESSING OF RADIO SIGNAL ACCORDING TO ALEONG

PROCESSING WITHIN INCOHERENT OPTICAL RECEIVER 220

PROHIBITED AREA OF COMPLEX SIGNAL

16QAM SIGNAL AFTER AMPLITUDE CONVERSION

16QAM SIGNAL AFTER DIFFERENT AMPLITUDE CONVERSION

OPTICAL FIELD TRANSMITTER AND OPTICAL FIELD TRANSMISSION SYSTEM

FIELD OF THE INVENTION

This invention relates to a technology of optical information transmission, and more particularly, to a technology suitable for transmission and reception of an optical multilevel signal transmitted via an optical fiber.

BACKGROUND OF THE INVENTION

In recent years, the amount of information that can be transmitted (transmission capacity) via one optical fiber has kept expanding owing to an increase in number of wavelength channels and a speedup of a modulation speed of an optical signal, but has almost reached capacity. This is because a wavelength bandwidth of an optical fiber amplifier that can be used for optical transmission has been almost used up. Under such circumstances, in order to further expand the transmission capacity of the optical fiber, it is necessary to enhance use efficiency of the frequency bandwidth by devising a signal modulation format to include a large number of optical signals in a limited frequency bandwidth.

In the world of radio communications, a multilevel modulation technology that has become widespread since 1960s allows transmission at such high efficiency that frequency use efficiency exceeds 10 (bit/s/Hz/sector). There have conventionally been many studies of multilevel modulation which is regarded as promising also in the field of optical fiber transmission. For example, "10 Gb/s Optical Differential Quadrature Phase Shift Key (DQPSK) Transmission using GaAs/AlGaAs Integration", R. A. Griffin, et al., OFC 2002, paper PD-FD6, 2002 discloses a technology of quadrature phase shift keying (QPSK) for performing four-level phase modulation. In addition, "Proposal and Demonstration of 10-Gsymbol/sec 16-ary (40 Gbit/s) Optical Modulation/Demodulation Scheme", Kenro Sekine, et al., paper We3.4.5, ECOC 2004, 2004 discloses a technology of sixteen-level phase and amplitude modulation that is a combination of four-level amplitude modulation and the four-level phase modulation.

FIGS. 1A to 1D are explanatory diagrams indicating characteristics of various conventional modulation formats that can be applied to the optical transmission.

In the examples of FIGS. 1A to 1D, signal points of optical modulation (display of complex information on an optical field at a decision timing for a signal) are plotted in a phase plane (on an IQ plane).

FIG. 1A is an explanatory diagram for a signal point on the phase plane, and each of signal points is equivalently displayed by a complex Cartesian coordinate on the IQ plane or polar coordinates including an amplitude r(n) and a phase $\phi(n)$.

FIG. 1B illustrates a signal example of the four-level phase modulation (QPSK) in which four values $(0, \pi/2, \pi, \text{ and } -\pi/2)$ are used as the phase angle $\phi(n)$ and two-bit information (00, 01, 11, and 10) is transmitted per symbol.

FIG. 1C illustrates a signal example of sixteen-level quadrature amplitude modulation (16 quadrature amplitude modulation (16QAM)) widely used in radio communications. The 16QAM, in which signal points are arranged in lattice, allows four-bit information to be transmitted per symbol. In the example of FIG. 1C, the Q-axis coordinate represents a value of upper two bits (10xx, 11xx, 01xx, and 00xx), and the I-axis coordinate represents a value of lower two bits (xx10, xx11, xx01, and xx00).

In a signal constellation of the 16QAM, it is possible to increase a distance between the signal points, which enhances the reception sensitivity, and in optical communications, the quadrature amplitude modulation can be realized by using a coherent optical receiver.

For example, "1 Gsymbol/s, 64QAM Coherent Optical Transmission over 150 km with a Spectral Efficiency of 3 Bit/s/Hz", J. Hongou, K. Kasai, M. Yoshida and M. Nakazawa, in Proc. Optical Fiber Communication Conf. (OFC/NFOFEC), Anaheim, Calif., March 2007, paper OMP3. discloses an experimental example of transmission/reception using a 64QAM signal. The coherent optical receiver represents a receiver that uses a local light source disposed within the receiver in order to detect the phase angle of the optical signal.

FIG. 1D illustrates a signal example of a sixteen-level phase and amplitude modulation format (16APSK format) in which the same number of signal points are arranged radiately in concentric circular shapes on the IQ plane.

Here, description is made of a coherent reception format which is one of conventional technologies for an optical multilevel receiver, for example, a coherent optical field receiver disclosed in "Coherent detection method using DSP to demodulate signal and for subsequent equalisation of propagation impairments", M. G. Taylor, paper We4. P. 111, ECOC 2003, 2003.

FIG. 2 is a configuration diagram of a coherent optical field receiver of a polarization diversity type, and the coherent optical field receiver of a polarization diversity type simultaneously receives information on two polarizations of the optical signal. An input optical signal 101 transmitted through an optical fiber transmission line is split into a horizontal (S) polarization component 105 and a vertical (P) polarization component 106 by a polarization beam splitter 102-1. The S polarization component 105 and the P polarization component 106 obtained by the splitting are input to the coherent optical field receiver 100-1 and the coherent optical field receiver 100-2, respectively.

In the coherent optical field receiver 100-1, a local laser source 103 having a wavelength substantially the same as the input optical signal 101 is used as a reference of an optical phase. local light 104-1 output from the local laser source 103 is split into two beams of local light 104-2 and local light 104-3 by a polarization beam splitter 102-2. The local light 104-2 and the local light 104-3 obtained by the splitting are input to the coherent optical field receiver 100-1 and the coherent optical field receiver 100-2, respectively.

In the coherent optical field receiver 100-1, an optical phase diversity circuit 107 combines the S polarization component 105 of an optical multilevel signal and the local light 104-2 which have been input with each other. The optical phase diversity circuit 107 generates an I (inphase) component output light 108 extracted from an inphase component of the local light 104-2 and the S polarization component 105 of the optical multilevel signal that have been combined with each other, and a Q (quadrature) component output light 109 extracted from a quadrature component of the local light 104-2 and the S polarization component 105 of the optical multilevel signal that have been combined with each other. The I component output light 108 and the Q component output light that have been generated are received by balanced optical receivers 110-1 and 110-2, respectively, the I component output light 108 and the Q component output light that have been received are converted into electrical signals. Then, the two electrical signals obtained by the conversion are time-sampled by A/D converters 111-1 and 111-2 to generate digitized output signals 112-1 and 112-2, respectively.

In the following description, as illustrated in FIG. 1A, the optical field of the received input optical signal 101 is represented as $r(n)\exp(j\phi(n))$. Here, the optical field of the local light 104-2 and the local light 104-3 is assumed to be 1 (originally including an optical frequency component, which is omitted). Further, "r" represents an amplitude of the optical field, "$\phi$" represents a phase of the optical field, and "n" represents a sampling timing.

The local light 104 actually includes random phase noise and a slight difference frequency component with respect to signal light, but the phase noise and the difference frequency component, which exhibit temporally slow phase rotation, are eliminated by a digital signal processing and therefore ignored.

The balanced optical detector 110-1 and the balanced optical detector 110-2 perform homodyne detection on the input optical signal 101 that has been input by using the local light 104-2, and output an inphase component and a quadrature component, respectively, of the optical field of the input optical signal 101 by taking the local light as a reference.

Therefore, the output signal 112-1 from the A/D converter 111-1 is represented by $I(n)=r(n)\cos(\phi(n))$, and the output signal 112-2 from the A/D converter 111-2 is represented by $Q(n)=r(n)\sin(\phi(n))$. However, in order to simplify a formula, constants including a conversion factor are all set to "1".

In the coherent optical field receiver, an optical multilevel signal can be received because all information pieces represented by an optical field $r(n)\exp(\phi(n))$ (here, I component and Q component) are easily obtained from the received input optical signal 101.

A digital operation circuit 113, which is a complex field operation circuit, gives an inverse function to linear degradation (for example, chromatic dispersion) exerted upon the optical signal during transmission, to thereby enable cancellation of influences including the linear degradation substantially completely. Further, processings such as retiming and resampling are performed as necessary to output an inphase component 114-1 of an optical field signal and a quadrature component 114-2 of the optical field signal that have been subjected to the processings.

As described above, the coherent optical field receiver 100-1 can obtain field information on one polarization component (for example, S polarization component) of the input optical signal 101 that has been received, but needs to receive the P polarization component as well because a polarization state of the optical signal changes during the optical fiber transmission. Therefore, the coherent optical field receiver 100-2 receives the P polarization component of the input optical signal 101 in the same manner, and outputs the field information on the received P polarization component as an optical field signal 114-3 and an optical field signal 114-4.

A digital operation/symbol decision circuit 115 resolves the change of the polarization state by subjecting the I component and the Q component of the respective polarizations output from the digital operation circuit 113 to conversion of the polarization state of the optical signal (for example, conversion of a linear polarization into a circular polarization).

Subsequently, the digital operation/symbol decision circuit 115 decides which symbol has been transmitted with high precision in comparison with, for example, the signal constellation illustrated in FIG. 1C. A decision result thereof is output as a multilevel digital signal 116.

By using the coherent optical field receivers described above, it is possible to obtain all the field information pieces on the received signal, which allows even a complicated multilevel signal to be received.

Further, the coherent optical field receivers described above cause the digital operation circuit 113 to subject an input signal to a compensation processing using an inverse function to a propagator of the optical fiber transmission line, which can compensate the linear degradation due to the chromatic dispersion or the like logically completely. Further, the compensation processing is greatly advantageous in that no limitation is imposed upon a compensation amount. However, the digital operation circuit 113 that is small in size and high in speed and has signal processing performance equal to or higher than 10 Gbit/sec is not available on the market at present, and is still in a verification step for effects obtained by partial experiments.

FIG. 3A is an example of eight-level phase and amplitude modulation light (8APSK) in which eight signal points are arranged in concentric circular shapes with a four-level phase and a binary amplitude. FIG. 3B is a configuration diagram of a conventional optical multilevel signal receiver for receiving phase and amplitude modulation light disclosed in Sekine et al.

In optical modulation in which a phase component is evenly divided as in an 8APSK signal, differential coding is used for modulation of the phase component. In the example of FIG. 3B, two levels (one bit) in amplitude and four levels (two bits) in phase difference from the previous symbol, i.e., $0, \pi/2, \pi$, and $-\pi/2$, are used for information transmission, and three-bit information is transmitted per symbol.

In the example of FIG. 3B, the 8APSK signal is used as the input optical signal 101. An optical splitter 120 splits the input optical signal 101 that has been input into three optical signals. Two of the optical signals obtained by the splitting are input to optical delay detectors 121-1 and 121-2, and the remaining one optical signal is input to an optical intensity detector 122.

The optical delay detectors 121-1 and 121-2 each include a first optical path that applies a delay of a symbol time T to the input signal and a second optical path that passes through a $-\pi/4$ phase shifter or a $+\pi/4$ phase shifter, and convert a phase modulation component into an optical intensity signal by causing the input optical signal 101 that has been input to interfere with a signal that had been received earlier by a timing T.

An output intensity of output light from the optical delay detector 121-1 that has passed through the $+\pi/4$ phase shifter becomes maximum when the phase difference between the reception symbol and the previous symbol is 0 or $+\pi/2$, and becomes minimum when the phase difference is $-\pi/2$ or $\pi$.

A binary decision circuit 123-1 receives the output light from the optical delay detector 121-1 via the balanced optical detector 110-1. A binary digital signal 124-1 for one bit is obtained by subjecting the received output light to a binary decision.

An output intensity of output light from the optical delay detector 121-2 that has passed through the $-\pi/4$ phase shifter becomes maximum when the phase difference between the reception symbol and the previous symbol is 0 or $-\pi/2$, and becomes minimum when the phase difference is $\pi/2$ or $\pi$.

A binary decision circuit 123-2 receives the output light from the optical delay detector 121-2 via the balanced optical detector 110-2. Another binary digital signal 124-2 for one bit included in the phase component is obtained by subjecting the received output light to the binary decision.

The optical intensity detector 122 converts an optical intensity of a received signal (square of an optical field amplitude) into an electrical signal. A binary digital signal 124-3 for one bit included in the amplitude component is obtained by causing a binary decision circuit 123-3 to subject the output of the electrical signal obtained by the conversion to the binary decision.

The optical multilevel signal receiver uses the optical delay detection, and hence a phase change of a light source or reception polarization dependence is reduced to a minimum, which makes a local oscillation light source unnecessary. Therefore, the optical multilevel signal receiver is applied to reception of an n-level phase modulation signal and an APSK signal having a radiate signal constellation up to sixteen-level.

SUMMARY OF THE INVENTION

This invention is to solve a problem with optical multilevel transmission and optical field transmission using a conventional incoherent format in that large limitations are imposed upon a signal constellation that can be received and optical field information thereon.

The incoherent format in which optical delay detection is used to obtain phase information on an optical signal has no polarization dependence in comparison with a coherent format, which makes a local light source unnecessary. As a result, the incoherent format enables low costs, makes a configuration of a receiver simple, and is easy to realize.

However, the incoherent format has room for an application range and a performance improvement greatly restricted by the limitations imposed upon the signal constellation that can be received and the optical field information thereon. For example, in the optical multilevel transmission, the incoherent format is applied only to multilevel phase modulation (FIG. 1B) or an APSK format (FIG. 1D and FIG. 3A) in which the same number of signal points are arranged radiately in concentric circular shapes.

It should be noted that, in general, the APSK format may indicate modulation that arbitrarily combines the amplitude and the phase. Therefore, hereinafter in this invention, in order to distinguish an APSK to which this invention is applied from the general APSK format, the "APSK format in which the same number of signal points are evenly arranged radiately in concentric circular shapes that have points at the same phase angles" is described as a radiate APSK format or radiate APSK modulation.

The radiate APSK format is characterized in that the phase and the amplitude of the multilevel signal are modulated independently of each other. In other words, the concentric circular shapes each correspond to an amplitude value different in optical field, and a phase is independently assigned to each of the signal points, with the result that each of the concentric circular shapes has all the signal points arranged in points at the same phase angle.

A signal constellation of the radiate APSK format can be received in the incoherent format. In other words, information included in an amplitude component can be received by an intensity receiver, and at the same time, information included in a phase component can be received by the optical delay detection independently. The intensity receiver represents a receiver for receiving an optical field which is the square of an amplitude of a light wave and thereby obtaining an amplitude component from the received optical field.

It should be noted that in the radiate APSK modulation described above, independence of a phase modulation component and an amplitude modulation component indicates a difference from reception in the incoherent format, and is irrelevant to an actual modulation procedure. In other words, the amplitude and the phase are not necessarily modulated by an independent modulator. For example, even a case where the amplitude and the phase are modulated by one optical field modulator is handled as the radiate APSK modulation having no difference from the reception in the incoherent format. Therefore, a case where the amplitude value is 1 (phase modulation) and a phase value is 1 (amplitude modulation) is also included in the radiate APSK modulation in a broad sense. The optical field modulator represents a modulator for generating an arbitrary optical field signal by modulating the amplitude component and the phase component of the optical field output from a laser source or the like into a desired state corresponding to an input electrical information signal.

In addition, the radiate APSK modulation described above is also irrelevant to logical coding or a time-basis signal constellation (for example, Torellis modulation), and defines only a constellation that can be formed on a complex optical field by the optical multilevel signal.

Therefore, there is a problem that it is hard to apply the incoherent format to the optical multilevel signal having a complicated signal constellation other than the constellation of the radiate APSK modulation. This is because, in a case where the signal points in the phase modulation and intensity modulation are arranged dependently, the optical delay detection generates a large number of signal points obtained by combining the amplitude and the phase complicatedly.

Further, transmission of general complex information, for example, transmission of a subcarrier modulation signal or the like represented by OFDM transmission or the like cannot use reception in the incoherent format incapable of detecting an "absolute phase of the optical field".

Therefore, WO 2007/132503 A1 by the inventors of this invention discloses the configuration of the optical field receiver that solves the above-mentioned problem. FIG. 11 of the inventors of this invention is an example of the optical field receiver for receiving the optical multilevel signal. A configuration described below includes the respective components of the optical field receiver illustrated in FIG. 11 of WO 2007/132503 A1.

An input optical multilevel signal 123 is split into three optical signals at an optical splitter 150. First and second optical signals obtained by the splitting are input to an optical delay detector 104-1 (set to a phase difference of 0) and an optical delay detector 104-2 (set to a phase difference of $\pi/2$), respectively, and a third optical signal is input to an optical intensity detector 151.

Outputs from the optical delay detectors 104-1 and 104-2 are converted into electrical signals x and y at a balanced optical receiver 105-1 and a balanced optical receiver 105-2, and input to a field operation unit 111 via an A/D converter 106-1 and an A/D converter 106-2, and a delay adjusting circuit 108-1 and a delay adjusting circuit 108-2, respectively.

An output signal from the optical intensity detector 151 is converted into a digital signal by an A/D converter 106-3, has a timing adjusted at a delay adjusting circuit 108-3, and is then input to the field operation unit 111.

It should be noted that a delay amount of the optical delay detector 104 is the symbol time T in FIG. 11 of WO 2007/132503 A1, but it is also indicated that, by setting the delay amount to T/2 and making a sampling speed smaller than this value, based on the Nyquist theorem, the optical field information can be reconstructed within the receiver and applied to compensation of the chromatic dispersion.

FIG. 17 of WO 2007/132503 A1 illustrate an example of the respective received electrical signals and a relationship between the reconstructed field signals.

The optical field of the received light is expressed by $r(n) \exp(j\phi(n))$, and hence n-th output signals x and y are values obtained by multiplying r(n)r(n−1), which is a product of consecutive amplitude values r(n) and r(n−1), by $\cos(\Delta\phi(n))$ and $\sin(\Delta\phi(n))$, respectively. Here, $\Delta\phi(n)=\phi(n)-\phi(n-1)$ is a phase difference between symbols.

Therefore, a phase difference $\Delta\phi(n)$ is operated by causing an inverse tangential operation circuit 113 to perform an arctan operation of the signals x and y. The phase $\phi(n)$ is calculated by causing a delay adding circuit 116 to cumulatively add the operated phase difference $\Delta\phi(n)$ for each sample.

Meanwhile, an output signal 110-3 is an intensity $\{r(n)\}^2$ for the n-th sample, and the amplitude value r(n) is obtained from a square root circuit 160. An original optical field r(n) exp(j$\phi$(n)) is obtained by using the amplitude value r(n) and the phase $\phi(n)$.

Hereinafter, description is made of a reception format disclosed in WO 2007/132503 A1 as an "incoherent field reconstruction format".

FIGS. 4A to 4D are explanatory diagrams each illustrating an example in which a signal processing in the incoherent field reconstruction format is subjected to a numerical simulation.

For example, assuming that the transmitted optical field is 16QAM illustrated in FIG. 4A, output signals (X, Y) from two orthogonal delay detectors which have received the transmitted optical field are two-dimensionally displayed by using a horizontal axis (dI) and a vertical axis (dQ) as in the example of FIG. 4B.

This is two-dimensional display in which the output signals obtained by performing the optical delay detection by multiplying r(n)r(n−1), which is a product of the amplitude values r(n) and r(n−1) of the optical field of a 16QAM signal, by $\cos(\Delta\phi(n))$ and $\sin(\Delta\phi(n))$ are combined with a complex signal r(n)r(n−1)exp(j$\Delta\phi$(n)) with the output signals set as a real part and an imaginary part, respectively.

In the examples of FIG. 4, there exist a large number of combinations of a product of amplitudes and a phase angle $\Delta\phi$, which become a complicated signal constellation having a large number of signal points, with the result that the optical signal cannot be detected. Therefore, only the phase angles $\Delta\phi$ are extracted within the receiver, an accumulation operation thereof is performed every time T, and an absolute phase $\phi(t)=\Sigma\Delta\phi(t)$ is reconstructed.

Further, by performing a processing of replacing an amplitude part of the optical field with a square root r(n) of an intensity signal obtained from the receiver, as illustrated in FIG. 4C, an original 16QAM signal can be reconstructed. It should be noted that the inclination of the signal points is caused by an initial value of a phase which is indefinite in a processing of the accumulation operation, and the 16QAM signal can be received by adding a processing in which an initial phase is estimated and the initial value of the estimated phase is eliminated.

By using the incoherent field reconstruction format, it is possible to detect the optical field of an arbitrary received signal even in the case of the reception in the incoherent format. However, the incoherent field reconstruction format has the following problems.

A first problem is accumulation of an error due to the delay adding circuit included in the receiver. For example, in a case where the delay amount of the optical delay detector includes a temporal error of 5%, a field to be reconstructed is caused to greatly rotate as illustrated in FIG. 4D. This is because the error accumulates when $\Delta\phi$ is accumulated within the receiver. In other words, this is because, if a process of accumulating $\Delta\phi$ includes even one error (including indefiniteness of the initial phase), the error is included in all the remaining calculation results, after which the error keeps included from then on. Therefore, the incoherent field reconstruction format has a problem that the initial phase is indefinite, an error is easy to accumulate, and a precise optical field is hard to detect.

A second problem is that continuity of the phase information on the optical signal is lost in a case where the amplitude of the received signal is substantially zero. In other words, if the amplitude r(n) becomes zero even once, outputs from the two optical delay detectors also become zero before/after that, thereby causing the continuity of the phase to be lost. In other words, the phases of all the optical fields obtained after the amplitude r(n) of the received signal becomes zero become indefinite. Therefore, in the incoherent field reconstruction format, in the case where the amplitude of the received optical field is substantially zero, it is extremely difficult to reconstruct the optical field.

A third problem is that distortion of an optical field waveform due to the chromatic dispersion inhibits the optical signal from being received. In other words, even in a case where optical multilevel modulation that does not lead to a zero amplitude is used for information transmission as in the radiate APSK modulation described above, the optical field waveform is greatly distorted when the optical signal is degraded due to the chromatic dispersion or the like of the optical fiber transmission line, which may cause a point of the zero amplitude that does not exist originally. In this case, the received signal is greatly degraded.

Therefore, it is a first object of this invention to solve the problem of error accumulation in an incoherent optical field detection format and to enable reception of the optical multilevel modulation other than the radiate APSK modulation with ease.

Next, it is a second object of this invention to solve the problem that information on a field in the vicinity of zero cannot be transmitted in an incoherent reception format.

Further, it is a third object of this invention to solve the problem that the distortion of the waveform due to the chromatic dispersion or the like makes it difficult to receive an optical field signal.

A representative embodiment of this invention is described as follows. Specifically there is provided an optical field transmitter including a light source, one or more DA converters and an optical field modulator. The optical field transmitter modulates an information signal sampled at predetermined time intervals into an optical field signal and transmitting the optical field signal obtained by the modulation. The information signal includes one of multilevel signals arranged irregularly on a complex plane and multilevel signals arranged by combining different numbers of phases in at least two amplitude values. The optical field transmitter further includes a phase pre-accumulation circuit for outputting phase pre-accumulation complex information obtained by previously accumulating a phase component of the information signal at predetermined time intervals. The one or more DA converters each converts the information signal including the output phase pre-accumulation complex information into an analog signal, and inputs the analog signal obtained by the conversion to the optical field modulator. The optical field modulator modulates the analog signal into the optical field signal by using light output from the light source, and transmits the optical field signal obtained by the modulation.

According to the embodiment of this invention, an accumulation processing is performed on a transmitting end in transmission of a complex information signal, and hence a phase error is not accumulated in comparison with the optical field reconstruction format, which allows the phase component to be calculated with high precision.

DETAILED DESCRIPTION OF THE PREFERRED EMBODIMENT

Figure 1A:
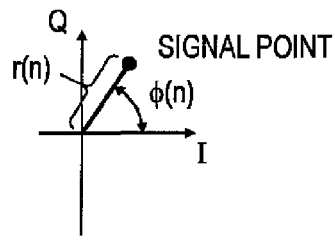
FIGS. 1A to 1D are explanatory diagrams indicating characteristics of various conventional modulation formats that can be applied to the optical transmission.
Figure 1B:
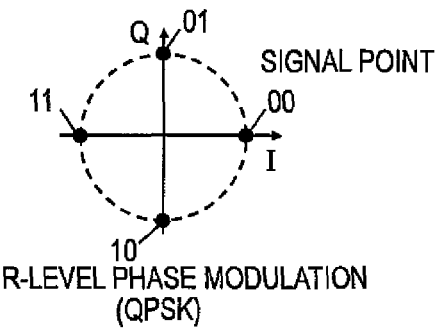
Figure 1C:
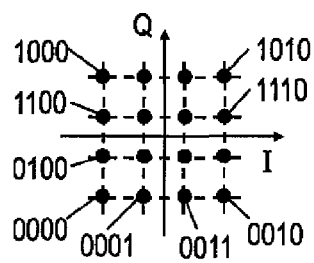
Figure 1D:
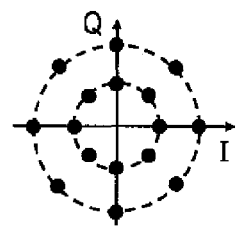
Figure 2:
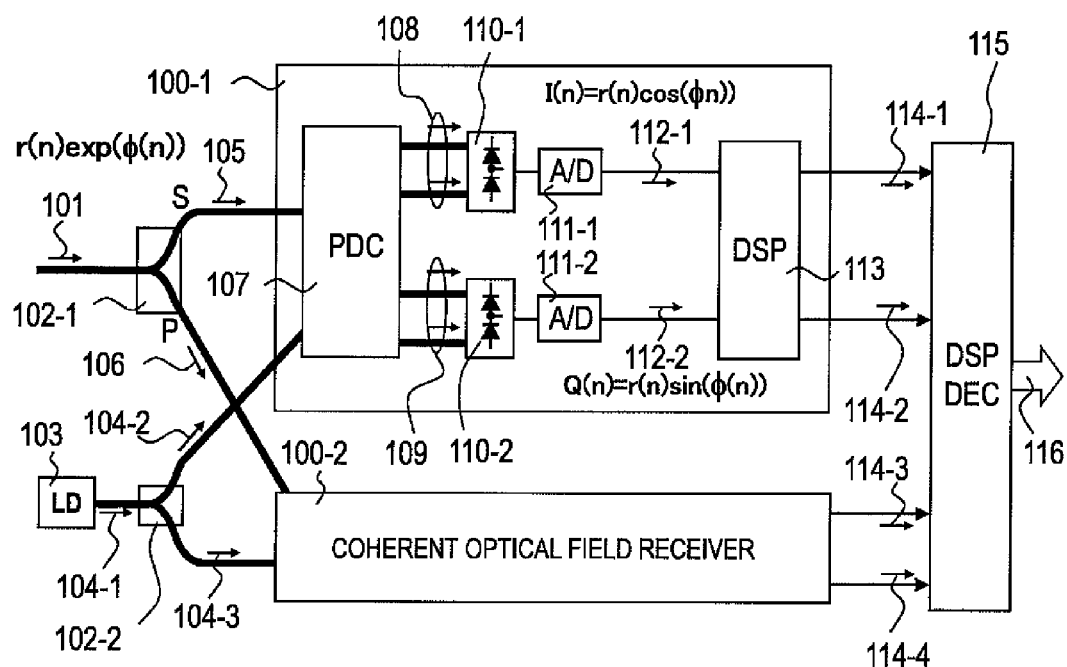
FIG. 2 is a configuration diagram of a coherent optical field receiver of a polarization diversity type.
Figure 3A:
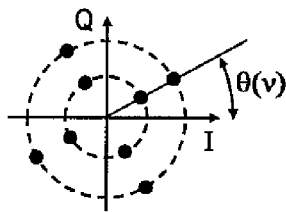
FIG. 3A is a conventional eight-level phase and amplitude modulation light (8APSK) and FIG. 3B is a configuration diagram of a conventional optical multilevel signal receiver for receiving phase and amplitude modulation light.
Figure 3B:
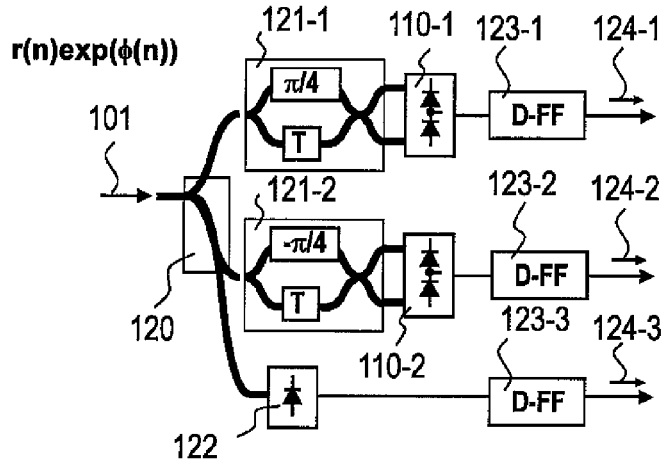
Figure 4A:
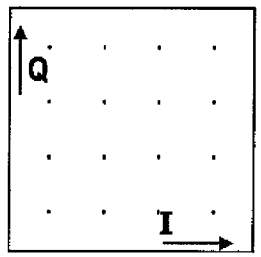
FIGS. 4A to 4D are explanatory diagrams each illustrating an example of a numerical simulation of a conventional signal processing in the incoherent field reconstruction format.
Figure 4B:
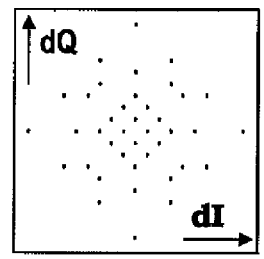
Figure 4C:
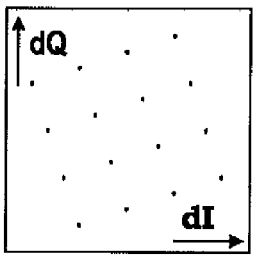
Figure 4D:
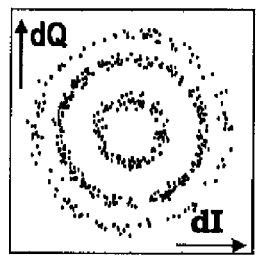

A description is now given of an overview of embodiments of this invention.

The first object of this invention can be achieved by generating phase pre-accumulation complex information obtained in advance by accumulating only the phase component of complex information other than the radiate APSK modulation at time intervals T at a time of transmission thereof, converting the generated phase pre-accumulation complex information into an optical field signal, and then transmitting the optical field signal. A receiving end may be configured so that the transmitted optical field signal is split and received by two optical delay detection type receivers having an optical phase difference of 90 degrees therebetween with a delay time of substantially T at the same timing, and that phase angle components of output signals therefrom are detected. Therefore, even in a case where a phase integration processing is not used on the receiving end, complex phase angles of the output signals dI and dQ from the two optical delay detection type receiver are the same as phase angles of original complex information, which can solve the problem of error accumulation. In a modulation process described above, if the digital operation is used for a phase accumulation processing, implementation becomes extremely practical. Then, the complex information may be converted into a high speed analog signal at a DA converter, and the optical field modulator may be driven by the analog signal obtained by the conversion.

Further, an optical intensity receiver is provided to an inside of the optical field receiver, and by combining obtained optical field (or optical intensity) information with the phase information described above, it becomes possible to restore complex information on a transmitting end with high precision and output the complex information.

Further, a signal processing necessary in the inside of the optical field receiver can be realized more easily by providing an AD converter to the subsequent stage of each of a plurality of optical field receivers described above, performing simultaneous digital sampling at a predetermined cycle, and converting the analog signal into a digital signal.

Further, performing the phase accumulation processing described above reduces intersymbol interference of the output signals from two pairs of optical delay detection type receivers and eliminates uncertainty of an initial phase of the output signal, which makes it easy to apply a reception symbol estimation technology such as most likelihood sequence estimation (MLSE).

Next, the second object of this invention is solved by performing coordinate conversion so as to prevent the amplitude of the complex information to be transmitted to an inside of an optical field transmitter according to this invention from becoming substantially zero, or by previously performing information transmission by using the multilevel complex information of a signal constellation having an amplitude value equal to or higher than a predetermined positive value. In the case of the former, the original complex information is restored by providing an inverse coordinate conversion circuit within the optical field receiver, and it becomes possible to output the restored complex information.

Next, the third object of this invention is solved by providing a preequalization circuit for fully or approximately equalizing degradation caused by an optical field transmitter/receiver and an optical transmission line in advance between a phase pre-accumulation circuit and a rough optical field modulator of the optical field transmitter according to this invention. In this case, by providing an input unit of the preequalization circuit with an oversampling circuit for oversampling rough complex information at a frequency being an integral multiple, the Nyquist theorem is satisfied, and it becomes possible to improve performance of the preequalization circuit.

Further, an optimal equalization amount varies according to a transmission distance or characteristics of the respective components. Therefore, a function of changing the equalization amount of the preequalization circuit may be provided. Further, in order to optimize the equalization amount, the equalization amount may be dynamically controlled to exhibit the best quality by using signal quality information obtained from the optical field receiver.

Referring to the drawings, a description is now given of the embodiments of this invention.

(First Embodiment)

Figure 5:
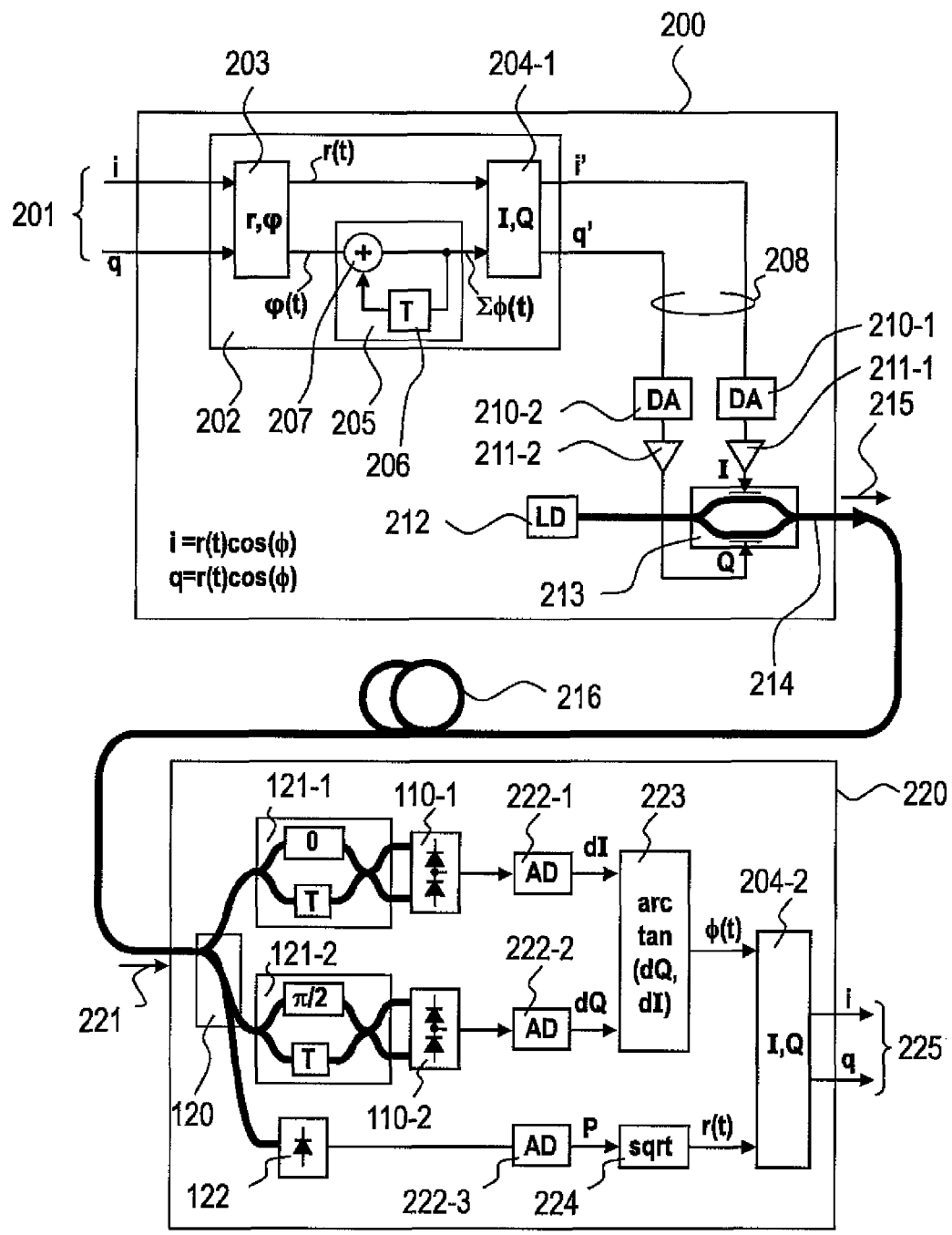
FIG. 5 is a configuration diagram of an optical field transmission system according to a first embodiment of this invention.

FIG. 5 is a configuration diagram of an optical field transmission system according to a first embodiment of this invention, in which a path of an optical signal is indicated by the thick line while a path of an electrical signal is indicated by the thin line.

In the first embodiment of this invention, unmodulated laser light output from a laser source 212 is input to an optical field modulator 213, and an optical field signal 215 subjected to a required field modulation is output from an optical fiber 214.

In the example of FIG. 5, a transmitted information signal is a digital electrical multilevel signal expressed as (i, q) on a two-dimensional phase plane (complex plane or IQ plane), being an information signal that is not included in a radiate APSK signal described above.

The digital electrical multilevel signal used in the first embodiment has a real part and an imaginary part of the signal input from i and q, respectively, of a complex information input terminal 201 at the time intervals T (in other words, a symbol time Tsa of the information signal is set to T). The signal input to the complex information input terminal 201 is input to a phase pre-accumulation circuit 202.

The phase pre-accumulation circuit 202 accumulates only the phase component of the multilevel signal at the time intervals T. For example, an input complex information signal is input to a polar coordinate conversion circuit 203, and the complex information signal is converted into an amplitude component $r(t)=\sqrt{i^2+q^2}$ and a phase component $\phi(t)=\arctan(q,i)$. Then, only the phase component obtained by the conversion is input to a phase accumulation circuit 205.

The phase accumulation circuit 205 includes a delay circuit 206 of a delay time T and an adding circuit 207, in which a phase accumulation value $\Sigma\phi(t)$ is obtained by repeating a processing for adding an input digital phase signal $\phi(t)$ to an accumulation value $\Sigma\phi(t-T)$ delayed by the time T.

Next, a phase pre-accumulation signal 208 being new complex information with an amplitude value r(t) set as the amplitude component and the phase accumulation value $\Sigma\phi(t)$ set as the phase component is generated, Cartesian coordinate display (i',q') is regained at a Cartesian coordinate conversion circuit 204-1.

The phase pre-accumulation signal 208 has the real part i and the imaginary part q converted into high speed analog signals by a DA converter 210-1 and a DA converter 210-2, respectively. The high speed analog signals obtained by the conversion are amplified by a driver circuit 211-1 and a driver circuit 211-2, respectively, and input to two modulation terminals I and Q of the optical field modulator 213. Therefore, the phase pre-accumulation signal (i',q') 208 is used to generate the optical field signal 215 including an inphase component I and a quadrature component Q of an optical field. As a result, the optical field of the optical field signal 215 is expressed as $r(t)\exp(j\Sigma\phi(t))$.

The optical field signal 215 is transmitted by using an optical fiber transmission line 216, and after receiving transmission degradation due to chromatic dispersion or the like of the optical fiber, input to an incoherent optical field receiver 220 as a reception optical field signal 221.

The reception optical field signal 221 is split into three optical signal paths by an optical splitter 120, and input to a first optical delay detector 121-1, a second optical delay detector 121-2, and an optical intensity detector 122, respectively.

The first optical delay detector 121-1 is set so that one of the two paths is delayed by a delay time Td=T, and that the optical phase difference between the two paths becomes zero.

Further, the second optical delay detector 121-2 is set so that one of the two paths is delayed by the delay time Td=T, and that the optical phase difference between the two paths becomes π/2.

Two output light beams from the first optical delay detector 121-1 and the second optical delay detector 121-2 are converted into electrical signals by a balanced optical detector 110-1 and a balanced optical detector 110-2, respectively. The electrical signals obtained by the conversion are converted into digital signals dI and dQ by A/D converters 222-1 and 222-2, respectively. Meanwhile, the electrical signal output from the optical intensity detector 122 is converted into a digital signal P by an A/D converter 222-3.

Subsequently, the digital signals dI and dQ are input to an inverse tangential operation circuit 223. The inverse tangential operation circuit 223 performs a two-argument inverse tangential operation taking the digital signal dI as an X component and the digital signal dQ as a Y component to calculate a phase angle. An operation of the inverse tangential operation circuit 223 is partially the same as an "incoherent field reconstruction format" described above. Assuming that the received optical signal is $r(n)\exp(j\theta(t))$, the digital signal dI is expressed as $dI=r(n)r(n-1)\cos(\Delta\theta(t))$, and the digital signal dQ is expressed as $dQ=r(n)\sin(\Delta\theta(t))$. Here, an output from the inverse tangential operation circuit 223 is expressed as $\Delta\theta(n)=\theta(t)-\theta(t-T)$.

In the first embodiment of this invention, the operation for accumulating the phase is performed by an optical field transmitter 200, and hence the field of the reception optical field signal is $r(t)\exp(j\Sigma\phi(t))$, in other words, $\theta(t)=\Sigma\phi(t)$. Therefore, the output signal from the inverse tangential operation circuit 223 is $\Delta\theta(n)=\Sigma\phi(t)-\Sigma\phi(t-T)=\phi(t)$, and a phase component $\phi(t)$ of the original complex information signal is extracted.

Meanwhile, an output signal P from an optical intensity detector is input to a square root circuit 224, and an original field amplitude r(t) is obtained as an output. Therefore, the field amplitude r(t) and the phase component $\phi(t)$ that have been obtained are input to a Cartesian coordinate conversion circuit 204-2, and hence the original digital electrical multilevel signal (i, q) can be reconstructed from a reconstruction complex information output terminal 225.

FIGS. 6A to 6D are explanatory diagrams illustrating kinds of complex multilevel information signal to which this invention is to be applied or not applied.

Figure 6A:
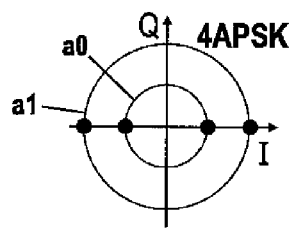
FIGS. 6A and 6B are explanatory diagrams illustrating kinds of complex multilevel information signal to which the first embodiment is not to be applied.
Figure 6B:
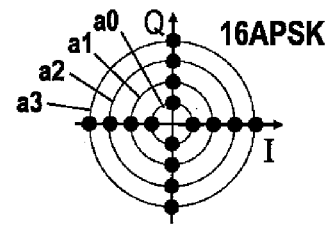

FIG. 6A and FIG. 6B are examples of the radiate APSK signal to which this invention is not applied, and are each characterized in that the same number of signal points are arranged at each of amplitude levels at the same phase angles at equal phase intervals.

For example, as illustrated in FIG. 6A, in a case of a 4APSK signal, two signal points are arranged at each of two amplitude levels a0 and a1 in positions of phase 0 and π at phase intervals n. Further, as illustrated in FIG. 6B, in a case of a 16APSK signal, signal points are arranged at each of four amplitude levels a0 through a3 at the phase angles 0, π/2, π, and 3π/2 at four equal intervals (phase intervals π/2).

There occurs no change in the phase angle of the output signal even when optical delay detection is performed because the phase intervals of the signal points are equal intervals, and hence there is no change in the signal constellation even if phase pre-accumulation according to this invention is performed. Accordingly, the examples of FIGS. 6A and 6B cannot produce the largest effect of this invention, specifically, "the phase accumulation processing on the transmitting end facilitates incoherent reception of the multilevel signal", and are therefore excluded from the subjects of this invention.

Figure 6C:
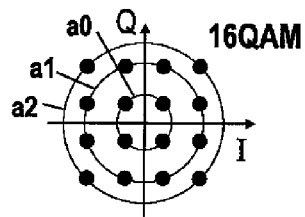
FIGS. 6C to 6E are explanatory diagrams illustrating kinds of complex multilevel information signal to which the first embodiment is to be applied.
Figure 6D:
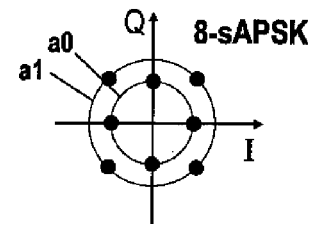
Figure 6E:
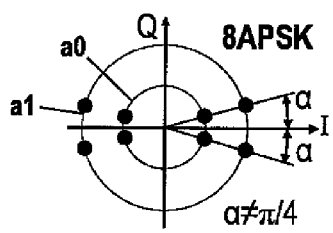

Meanwhile, FIG. 6C through FIG. 6E are signal constellations to which this invention is to be applied. For example, as illustrated in FIG. 6C, a 16QAM signal has three amplitude levels a0, a1 and a2, but is a non-radiate APSK signal having four signal points at the amplitude level a0, eight signal points in the amplitude level a1, and four signal points in the amplitude level a3, which is a subject to which this invention is to be applied.

Further, as illustrated in FIG. 6D, an 8-sAPSK signal in which four signal points in the amplitude level a0 and four signal points in the amplitude level a1 are arranged alternately is also a subject to which this invention is to be applied because the phase angles of the signal points are different between the levels.

Further, as illustrated in FIG. 6E, an 8APSK signal is also a subject to which this invention is to be applied because the phase intervals of the signal points are uneven. In the optical signal such as the 8APSK signal, if $\alpha \neq \pi/2$, the phase angles formed by (dI,dQ) from delay detection receivers increase from originally four phase angles $(0, \pm 2\alpha, \pi)$ to a maximum of six angles $(0, \pm \alpha, \pi, \pi \pm \alpha)$, which makes it difficult to decide the output signal.

The signals to which this invention is to be applied are commonly characterized in that the signal cannot be generated only by modulating the amplitude and the phase independently, or that the number of the signal points changes when the delay detection is performed.

FIGS. 7A to 7E are explanatory diagrams each illustrating an operation principle according to the first embodiment of this invention.

Figure 7A:
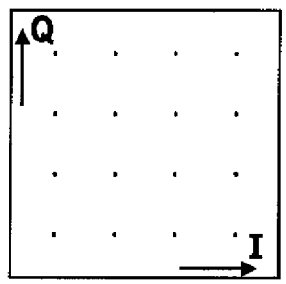
FIGS. 7A to 7E are explanatory diagrams each illustrating an operation principle according to the first embodiment of this invention.
Figure 7B:
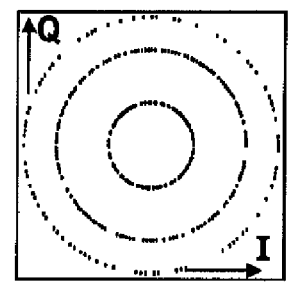

When complex information to be transmitted is assumed to be the 16QAM signal of FIG. 7A, a phase accumulation signal according to this invention becomes FIG. 7B. As illustrated in FIG. 7B, when only the phase component of the 16QAM signal is accumulated, a correspondence between the phase and the amplitude of each of the signal points is temporarily lost, and the signal points are distributed in concentric circles corresponding to the three amplitude levels of the original 16QAM signal.

Figure 7C:
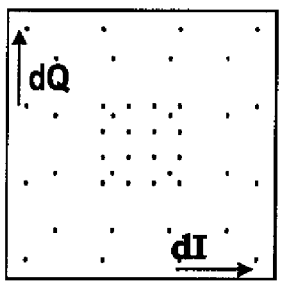
Figure 7D:
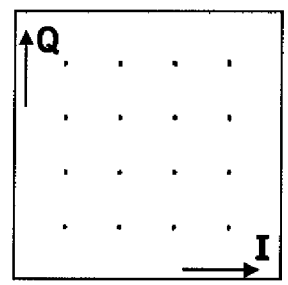

In the first embodiment of this invention, the phase accumulation signal is converted into the optical field and transmitted, and in the incoherent optical field receiver 220, the optical field signal is simultaneously received by the two optical delay detectors exhibiting phases perpendicular to each other with the delay time T. In FIG. 7C, the output signals dI and dQ from the optical delay detectors are two-dimensionally displayed as the abscissa and the ordinate.

As illustrated in FIG. 7C, the amplitude levels increase in number because the amplitude r(t) interferes with the previous symbol r(t−1), but a phase angle ϕ(t) of the original 16QAM signal can be reconstructed as the phase angle of each of the signal points. Therefore, by replacing the amplitude value with r(t) obtained from an intensity receiver, it is possible to reconstruct a complex signal illustrated in FIG. 7D. The reconstructed complex signal completely coincides with the 16QAM signal of FIG. 7A.

Thus in the first embodiment of this invention, complex multilevel information to be transmitted does not directly correspond to an actual optical field signal, and does not clearly decided as the signal points on the optical field. However, after reception in an incoherent format, the original signal constellation is reconstructed by using characteristics of the delay detection.

The largest effect of this invention is that the reconstructed signal points are hardly influenced by noise and an error of a transmitter/receiver. This is an effect produced by performing the phase accumulation processing performed on the receiver in the conventional "incoherent field reconstruction format" by way of the digital operation on the transmitting end. In other words, the digital operation on the transmitting end, which is a completely ideal numerical operation, can completely avoid an influence of the noise and the error of the transmitter/receiver occurring during the transmission without being influenced thereby.

Figure 7E:
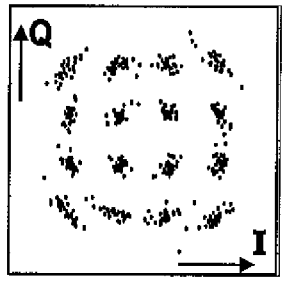

FIG. 7E illustrates an example in which random noise is applied to each of the signal points while the optical field signal is being transmitted with an error of 5% being assumed in a delay amount of a delay detector, and indicates that the original 16QAM signal is split even if the noise is applied, which makes it possible to confirm the effect of the first embodiment of this invention.

It should be noted that a phase accumulation operation according to this invention is different from differential coding conventionally used for phase modulation in the following points in terms of the object and contents of the processing.

First, in the conventional differential coding, a logical operation processing for changing a bit pattern in advance is performed because the bit pattern of the information signal output from the receiver changes by the use of the delay detection.

In other words, there is no change occurring in the waveform of the optical signal output by the processing for the differential coding or the signal constellation thereof. For example, the waveforms (optical field waveforms) transmitted by using a QPSK format being four-level phase modulation and a DQPSK format being differential phase modulation are completely the same waveform. The two waveforms are different only in the information to be transmitted, and cannot be distinguished one from another by observing the waveform or the signal points.

Meanwhile, the phase accumulation processing according to this invention is a digital numerical operation for accumulating the phase angles of the signal points at each symbol. In other words, in the non-radiate APSK modulation to which this invention is to be applied, the optical field waveform output from the transmitter by performing the phase accumulation processing changes into the waveform completely different from the original complex information (see FIG. 7A and FIG. 7B). Therefore, a phase accumulation measure according to this invention is greatly different from the conventional differential coding.

Second, in the non-radiate APSK modulation to which this invention is to be applied, the number of signal points and the signal constellation greatly change by performing the delay detection. Therefore, this invention cannot be applied to the logical differential coding used for conventional optical communications.

Meanwhile, in this invention, phase differences are accumulated irrespective of logical coding, and hence this invention can be applied to any non-radiate modulation code.

Further, one of advantages of this invention is that an error is suppressed to a minimum when there occurs a zero hit, which is such an event that the amplitude of the optical field becomes zero, and the error does not spread to the subsequent processings.

In the incoherent optical field receiver 220 illustrated in FIG. 5, for example, if the amplitude r(t) of the field of the input optical signal is zero at a timing to, the two output signals dI and dQ illustrated in FIG. 5 become zero at two points of timings "to" and "to+T". Of the two timings, at the timing "to", an optical intensity receiver 122 may detect that the amplitude is zero and set the output signal to zero. However, the output signal at the timing "to+T" has an amplitude r(to+T) detected in the same manner, but the amplitude is not always zero. In this case, in the inverse tangential operation circuit 223, an input signal is dI=dQ=0, and hence the output signal (phase rotation amount since before the timing T) is not to be defined. In the incoherent field reconstruction format disclosed in WO 2007/132503 A1, the error keeps included in all the optical phases from then on, which may cause an error to occur in the received signal.

Meanwhile, in a phase pre-accumulation processing according to this invention, the phase accumulation is not necessary in the receiver. Therefore, even if the zero hit occurs, the influence is only that the phase of the output signal at a timing t0+T becomes unknown, and a correct output can be obtained from the subsequent signal.

Next, description is made of respective components of the optical field transmitter 200 and an optical field receiver 220 according to this invention.

For the optical field modulator 213, usually, an optical IQ modulator (also referred to as dual parallel modulator or optical SSB modulator), which is constituted by two Mach-Zehnder optical modulator configured as a Mach-Zehnder interferometer, is used. The optical IQ modulator directly converts voltage signals applied to two I and Q terminals into an IQ signal of the output optical field, and is thus suitable for the optical field modulator 213 according to this invention.

Further, as the IQ modulator, there are known a modulator employing lithium niobate crystals and a modulator employing semiconductors, and, as long as equivalent functions are provided, any modulator can be used.

Further, when the applied voltage approaches a half-wave voltage $V\pi$, those modulators lose linearity in the field modulation, but this problem can be solved by a method of decreasing the applied voltage so that the range of the applied voltage sufficiently falls in the linear range, a method of realizing linearity by a table for applied voltage and an external compensation circuit which provides an inverse characteristic compensating the non-linearity, and the like.

Further, instead of the optical IQ modulator, a plurality of modulators, such as a tandem arrangement of an amplitude modulator and a phase modulator, can provide a similar effect. In this case, voltage signals fed to the respective modulators need to be converted in advance by a proper coordinate conversion (such as coordinate conversion to a polar coordinate).

The high speed DA converters (210-1 and 210-2) do not perform an ideal operation in actuality, but may generate unnecessary high-frequency harmonics that do not satisfy a Nyquist condition or may cause distortion of an output waveform due to bandwidth shortage or the like.

Further, the driver circuits (211-1 and 211-2) may cause waveform distortion due to saturation, bandwidth shortage, ripple, and the like, but an electrical circuit for compensating the caused distortion may be inserted to the optical field transmitter 200 according to the this invention as appropriate.

Further, in the example of FIG. 5, the digital signal and digital operation circuits such as the complex information input terminal 201, the phase pre-accumulation circuit 202, the polar coordinate conversion circuit 203, the Cartesian coordinate conversion circuit 204, the phase accumulation circuit 205, the phase pre-accumulation signal 208, the inverse tangential operation circuit 223, the square root circuit 224, and the reconstruction complex information output terminal 225 are set as a high speed serial electrical signal and processings of the high speed serial electrical signal. However, in general, the transmission of a high speed digital signal is configured so that transmission of a plurality of low speed electrical digital signals is made to be parallel. Therefore, internal components of respective circuits and a wiring for connecting the respective circuits may be those used for a parallel and low speed digital signal processing having an equivalent function and transmission amount and a digital line.

It should be noted that, in a case where the first optical delay detector 121-1 and the second optical delay detector 121-2 within the receiver are substantially perpendicular to each other, it is not necessary to set the optical phase difference therebetween to 0 and $\pi/2$. However, in this case, the output complex signal includes excess phase rotation, which necessitates a rotation operation for eliminating the phase rotation.

Further, the phase difference and mutual codes are eliminated by a simple complex operation even if positive and negative are inverted because the output signal is only inverted electrically or rotated on the complex plane.

It should be noted that a case of exhibiting one digital sample point per symbol is illustrated as the simplest example for the optical field transmitter 200 and the incoherent optical field receiver 220 according to the first embodiment, of this invention.

Although not illustrated in the figures, the respective output signals need to be synchronized with each other as appropriate. For example, in the optical field transmitter 200, the lengths of paths along which the two signals i' and q' are sent from the Cartesian coordinate conversion circuit 204-1 to the optical field modulator 213 need to be adjusted to be equal to each other.

Further, the incoherent optical field receiver 220 needs a retiming circuit configured to adjust a timing for A/D converting the received optical signal to a timing at the center of each symbol. Further, the delay times for paths along which the two signals dI and dQ are sent from the optical splitter 120 to the inverse tangential operation circuit 223 need to be adjusted to be equal to each other. Further, timings at which the phase signal $\phi(t)$ and the amplitude signal r(t) arrives at the Cartesian coordinate conversion circuit 204-2 need to be adjusted to be equal to each other. The above-mentioned adjustments may be performed by an analog delay line, a phase-shift circuit, and a digital delay circuit as appropriate.

Further, the time interval T at which the phase signal is accumulated by the optical field transmitter 200 according to the first embodiment of this invention need to be substantially equal to the delay time of the optical delay detectors (121-1 and 121-2) of the incoherent optical field receiver 220. Therefore, the time interval at which phase integration is performed by the optical field transmitter and the time interval at which the phase difference is detected by the optical delay detectors (121-1 and 121-2) of the incoherent optical field receiver 220 become equal to each other, and the original complex information can be correctly restored at the incoherent optical field receiver 220.

The time interval T is basically set arbitrarily with respect to a sampling interval Tsa of the complex information signal. However, if the time interval T for the phase accumulation is set longer than necessary, there arise a problem that the signal easily receives an influence of phase noise of the optical signal, a problem that long-duration intersymbol interference occurs in the output signal, and other such problem. On the other hand, if the time interval T for the phase accumulation is set short, the phase of the phase accumulation signal is caused to rotate faster than that of the original complex signal, and the bandwidth of the optical field signal to be output becomes wide. This may easily subject the signal to the degradation due to the chromatic dispersion or the like. Therefore, the time interval T is suitably set to a range from Tsa to several times larger Tsa.

It should be noted that the phase at a symbol timing is transmitted in a case of the multilevel signal with a symbol speed Ts being clearly set, and hence the time interval T is effectively set substantially in accordance with Ts.

Further, from the viewpoint of the Nyquist theorem, in order to avoid a dropout of information, Tsa is more effectively set to equal to or smaller than half of Ts. With the time interval T being thus set, even if T≠Ts, a phase value at the timing at the center of the symbol can be accurately interpolated.

Further, in the first embodiment of this invention, the square root circuit 224 is used for the output from the optical intensity receiver 122, but the square root circuit 224 may not necessarily be used. In this case, the complex signal with the intensity of the received signal having been replaced with the amplitude is obtained from the output, but the field amplitude and intensity is in conversion relationship of 1:1, and hence in the case where the multilevel signal is received, only the arrangement of the signal points in an amplitude direction is simply changed. However, in general, when the signal is converted into the field with the noise distribution linearized, it becomes easier to suppress the influence of the noise upon decision of the received signal points.

It should be noted that "A Technique for Combining Equalization with Generalized Differential Detection" K. M. Aleong et al., IEEE Int. Phoenix Conf Computers, Commun. (Scotsdale, Ariz.), March. 1993 discloses a format for radio transmission in which only the phase component of the complex signal is accumulated on the transmitting end and transmitted.

Figure 8A:
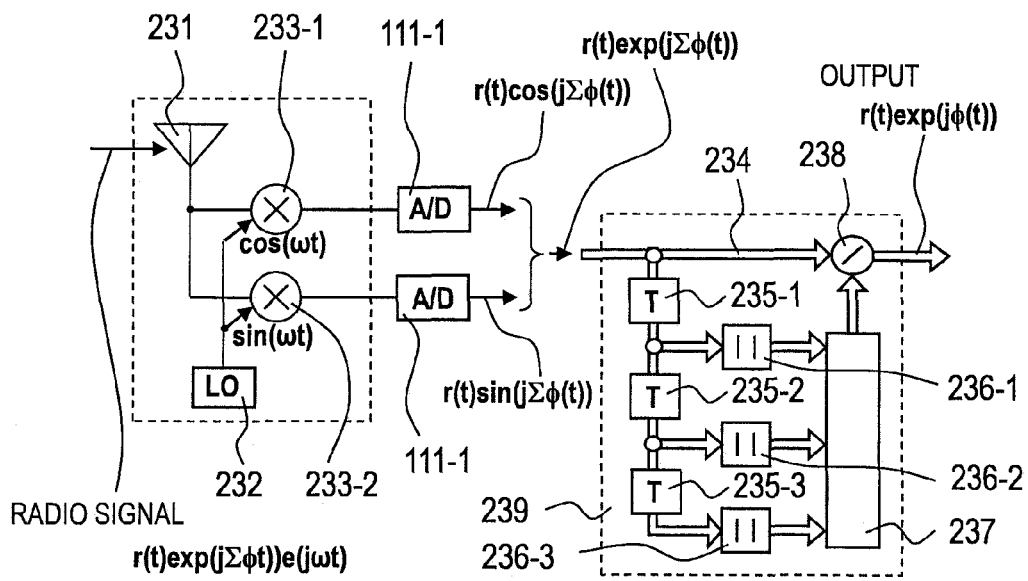
FIG. 8A is an explanatory diagrams illustrating an outline of a conventional signal processing for a radio signal and FIG. 8B is an explanatory diagrams illustrating an outline of a signal processing performed by a detector of an incoherent format according to the first embodiment of this invention.

FIG. 8A is a diagram illustrating an outline of a conventional signal processing for a radio signal.

In the example illustrated in FIG. 8A, a radio signal r(t)exp(jΣφ(t))e(jωt) is received by an antenna 231, and a complex information signal r(t)exp(jφ(t)) is obtained from the received signal. Here, ω represents a carrier frequency. In a wireless signal processing, mixers 233-1 and 233-2 are used to remove carrier components by multiplying a sine component and a cosine component of a local oscillator 232, respectively.

Subsequently, output signals from the mixer 233-1 and the mixer 233-2 are converted into low speed digital signals r(t)cos(jΣφ(t)) and r(t)sin(jΣφ(t)) by AD converters 111-1 and 111-2. As a result, a complex signal r(t)exp(jΣφ(t)) is generated by taking the converted low speed digital signals as the real part and the imaginary part, respectively.

Subsequently, the complex signal passes through the path of an operation path 234 for a digital complex signal indicated by the double line in FIG. 8A, and is subjected to the delay detection by a delay detection circuit 239 for the radio signal.

The delay detection circuit 239 for the radio signal includes delay circuits 235-1 through 235-3 for delaying the signal by the time T, a phase estimation circuit 237, and a complex division circuit 238. The input complex signal is delayed by the time T by the respective delay circuits 235, and then the amplitude components thereof are eliminated by amplitude limiter circuits 236-1 through 236-3.

The complex signal from which the amplitude component has been eliminated is input to the phase estimation circuit 237, a delay phase signal exp(jΣφ(t−T)) with errors of the phases having been averaged and eliminated is output. It should be noted that exp(jΣφ(t−T) is output from the amplitude limiter circuit 236-1 as well, but the phase estimation circuit 237 reduces a phase error by using phase error information at the past symbol.

Subsequently, the complex signal r(t)exp(jΣφ(t)) and the delay phase signal exp(jΣφ(t−T)) are input to the complex division circuit 238, and a result of dividing (in Aleong, multiplying phase conjugation of the delay phase signal) the complex signal by the delay phase signal is output as an output signal r(t)exp(jφ(t)).

Figure 8B:
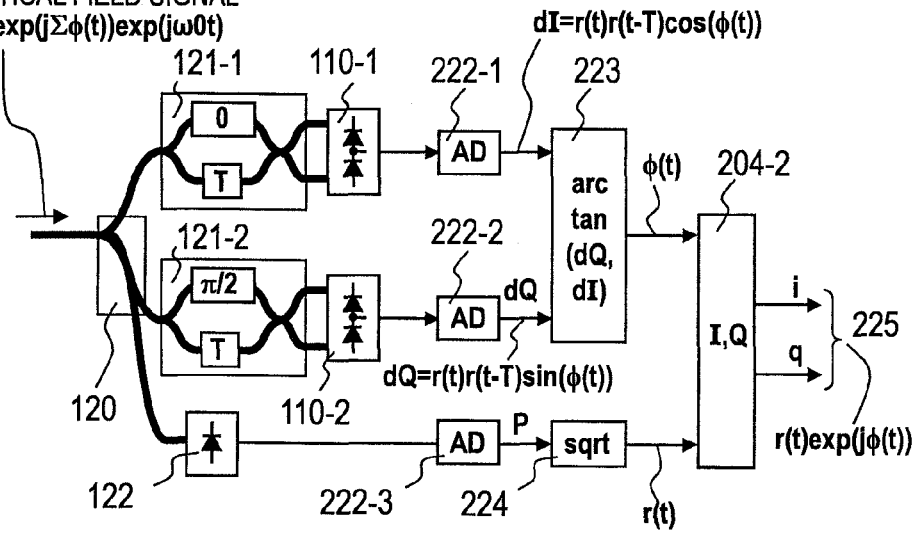

Meanwhile, in order to compare with the signal processing illustrated in FIG. 8A, FIG. 8B illustrates an outline of a signal processing performed by a detector of the incoherent format according to the first embodiment of this invention.

The optical field signal received by the incoherent optical field receiver 220 illustrated in FIG. 8B is expressed as r(t)exp(jΣφ(t))exp(jω_0 t). It should be noted that the optical field signal is expressed here by using an optical carrier frequency ω0, which is usually omitted, for the comparison.

The optical field signal is split into two at the optical splitter 120. The optical field signals obtained by the splitting cause optical interference with the signal earlier by the time T at the optical delay detectors (121-1 and 121-2) for a delay amount T with the phase difference being set to 0 and π/2. When results of the optical interference are converted into digital signals at an AD converter 222-1 and an AD converter 222-2, the output signals become dI=r(t)r(t−T)cos(φ(t)) and dQ=r(t)r(t−T)sin(φ(t)), respectively, as described above.

Subsequently, only the phase angle φ(t) is extracted from the output signal, and the amplitude part is replaced with r(t) obtained from the path of the intensity receiver 122, thereby obtaining an original optical field signal r(t)exp(jφ(t)).

The reason that a difference occurs in the processing between FIG. 8A and FIG. 8B is because coherent reception using a local light source makes the configuration of the receiver complicated and impairs practicability in the case of the incoherent optical field receiver 220.

Therefore, the incoherent optical field receiver 220 used in the first embodiment of this invention is different from the receiver used for radio communications, and performs the optical delay detection involving the carrier component. As a result of the optical delay detection, the amplitude part of the output signal from the optical delay detectors (121-1 and 121-2) becomes the form of a product of amplitudes as expressed by r(t)r(t−T), and the signal processing becomes difficult. This necessitates such a complicated configuration that the amplitude part is obtained from the optical intensity receiver 122 after the optical delay detection, and that the output signal and the amplitude part are combined at the Cartesian coordinate conversion circuit 204-2.

Meanwhile, the delay detection performed on the digitized complex signal suffices in the case of the processing of the radio signal. Therefore, as described above, the delay detection circuit 239 is configured by using a processing of causing the limiter circuit to erase the amplitude component of a delay signal, a processing using complex conjugate that is difficult to realize in the operation of the optical signal, and other such processing. Therefore, the objects of an optical field detection cannot be achieved simply by employing the phase accumulation of the radio signal as the configuration of this invention.

The first embodiment of this invention produces an effect that, in transmission of a complex multilevel signal, the phase angle of the complex signal to be output from the receiver becomes equal to an absolute phase of the complex information to be input to the transmitter. This is extremely effective particularly when the complex information signal modulated in non-radiate APSK is transmitted. In addition, it becomes possible to completely reproduce, on the receiving end, a signal of the complex information input to the optical field transmitter by including an optical intensity receiver and replacing the amplitude of the complex signal to be output from the receiver with an amplitude obtained from the optical intensity receiver.

Further, unlike a conventional coherent detection format, the first embodiment relates to the incoherent format using the optical delay detector, and needs no local oscillation light source without depending upon a polarization state of input light, which makes it easy to configure the receiver.

Further, a conventional optical multilevel receiver of an incoherent type has a circuit scale becoming larger as the number of multilevels of a received signal increases, but the optical field receiver and the optical multilevel receiver according to the first embodiment can decide a symbol of the received signal with the same hardware scale even in a case where the number of multilevels of a modulation signal is increased. Further, according to the first embodiment, a field operation of the received optical signal and multilevel decision thereof can be executed by an electrical digital circuit, and hence the same configuration of the receiver can be adapted to the optical signal different in number of multilevels and modulation format.

Further, according to the first embodiment, in which the initial phase of the output signal becomes constant by pre-accumulation of the phase component, it is possible to solve the problem that the initial phase is unknown in the optical field reconstruction format. Therefore, differential detection is realized within the receiver again, and hence the operation of eliminating a phase change of a light source and the initial phase becomes unnecessary.

Further, according to the first embodiment, it is possible to execute preequalization and the multilevel decision by the electrical digital circuit. Further, the first embodiment can be applied to not only the receiver for optical fiber communications but also, for example, an optical field waveform measurement device and an optical space transmission device.

Further, in the first embodiment, even if there occurs a phenomenon (zero hit) in which it becomes difficult to detect the optical field with the field amplitude of the received optical signal being substantially zero, only one error occurs in principle with the result that the error does not spread from then on. This is an effect that is extremely useful for maintaining the transmission degradation in optical communications to a minimum.

(Second Embodiment)

Figure 9:
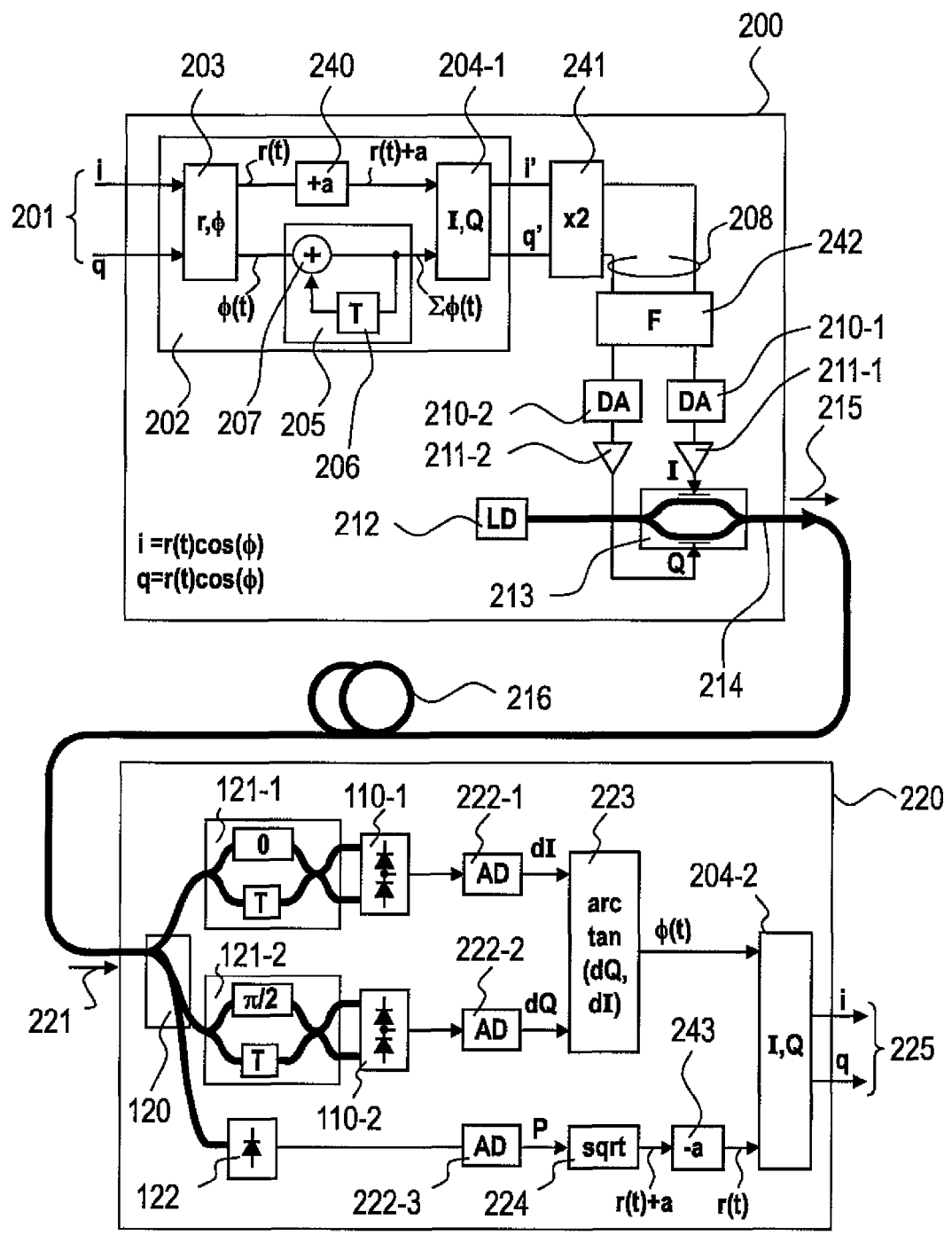
FIG. 9 is a configuration diagram of an optical field transmission system according to a second embodiment of this invention.

FIG. 9 is a configuration diagram of an optical field transmission system according to a second embodiment of this invention.

In the second embodiment of this invention, the optical field transmitter 200 includes an amplitude conversion circuit 240 as a kind of a coordinate conversion circuit, an oversampling circuit 241, and a preequalization circuit 242. The second embodiment is different from the first embodiment described above in that the incoherent optical field receiver 220 includes an amplitude inverse conversion circuit 243 as a kind of an inverse coordinate conversion circuit.

In the second embodiment, a sampling speed of the complex signal input to the complex information input terminal 201 is assumed to be, for example, 1 sample/symbol. Further, in the phase pre-accumulation circuit 202, the amplitude conversion circuit 240 is located along the path of the amplitude component r(t) obtained by the splitting performed by the polar coordinate conversion circuit 203. The amplitude conversion circuit 240 adds a positive constant value "a" to the amplitude r(t).

Further, the oversampling circuit 241, which is located immediately after the Cartesian coordinate conversion circuit 204-1, complements a sampling point (oversampling) so that the sampling speed (sampling frequency) becomes 2 samples/symbol. When the sampling point is complemented, the Nyquist theorem is satisfied, and hence a complete field equalization processing is made possible. Further, the sampling speed may be multiplied by an integer, and the oversampling is performed so that the sampling point is complemented.

The preequalization circuit 242 applies the inverse function for degradation occurring in the optical fiber transmission line 216 or the like to the phase pre-accumulation signal 208.

Meanwhile, the amplitude inverse conversion circuit 243 for performing an inverse operation of subtracting the constant value "a" from a signal r(t)+a output from the square root circuit 224 is located in the incoherent optical field receiver 220.

The object of the amplitude conversion circuit 240 and the amplitude inverse conversion circuit 243 is to avoid the zero hit described above.

Figure 10A:
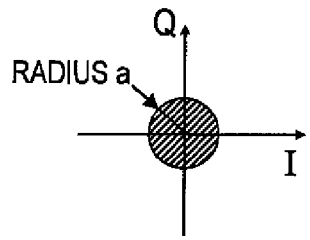
FIGS. 10A to 10C are explanatory diagrams each illustrating coordinate conversion of a complex signal according to the second embodiment of this invention.
Figure 10B:
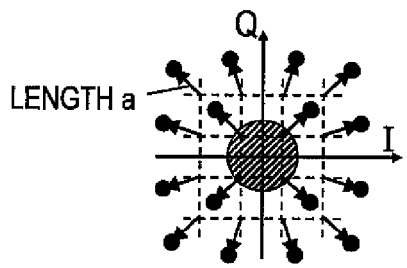
Figure 10C:
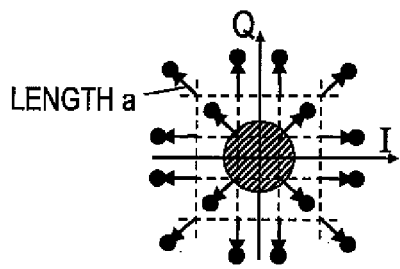

FIGS. 10A to 10C are explanatory diagrams illustrating coordinate conversion of a complex signal according to the second embodiment of this invention.

In general, in an area with the amplitude of the waveform being small, random noise applied due to optical fiber transmission is likely to cause the zero hit. Therefore, in the second embodiment, as illustrated in FIG. 10A, an area with a radius "a" about an origin point at which the amplitude becomes zero is set as a prohibited area, and the coordinate conversion is performed so that sample points of the optical field to be transmitted are arranged outside this area.

In other words, the amplitude conversion circuit 240 adds the constant value "a" only to the amplitude component to thereby cause all the signal points to move outward radiately from the center as illustrated in FIG. 10B. The optical fiber transmission is performed with the probability of the zero hit being lowered by the coordinate conversion, and when the reconstruction of the complex signal is completed, the amplitude value is returned to an initial value.

Therefore, the complex signal having any signal constellation becomes capable of avoiding the zero hit. It should be noted that in a case where an original complex signal has a signal point at the origin point (zero amplitude), the signal point may be moved to any position on a circumference of a circle with the radius "a".

It should be noted that a method for the coordinate conversion is not limited to the above-mentioned method, but, for example, as illustrated in FIG. 10C, the conversion may be performed in such a manner that the respective signal points are caused to move outward radiately by "a" from the center only with the phase angles of 0, 45 degrees, and 90 degrees. Such coordinate conversion can be realized easily in a Cartesian coordinate system. Specifically, the signal points are caused to move with the limited phase angles, and hence a calculation amount for movement of the signal points becomes smaller than in the case illustrated in FIG. 10B, which makes it easy to configure the circuit.

Further, the conversion involving the arbitrary phase rotation or the conversion using the reciprocal of the amplitude may be performed. Further, in a case where the signal constellation of the complex information is arbitrarily selected, a method is also effective in which the signal points are selected so as to be arranged at the signal points (signal points having an amplitude of a positive value equal to or larger than a predetermined value) that avoid the vicinity of the zero point as illustrated in FIG. 10B or FIG. 10C from the start.

Next, as described above, the preequalization circuit 242 previously compensates the waveform degradation occurring in a transmission line such as the optical fiber and the transmitter/receiver. Further, the preequalization circuit 242 suppresses the waveform degradation due to the chromatic dispersion or the like, which becomes a problem in high-speed and long-distance fiber transmission, and enables, in particular, the long-distance fiber transmission. Further, the case where the preequalization circuit 242 is combined with the configuration of this invention produces the effect of avoiding the zero hit, which is extremely effective.

In other words, the waveform degradation due to the chromatic dispersion or the like may change the optical field waveform and may cause the zero hit that does not exist originally, but in a case where the optical field signal is output after the inverse function of the waveform degradation is previously applied thereto by the preequalization circuit 242, the characteristics of the transmission line and the applied inverse function are canceled. Therefore, the reception optical field signal 221 input to the incoherent optical field receiver 220 causes no zero hit in theory.

It should be noted that the transmission degradation due to the chromatic dispersion or the like need not be equalized fully only by the preequalization circuit 242, and may be equalized by a measure in which a dispersion compensation fiber is located midway through the transmission line or in which a tunable dispersion compensator is located immediately before the incoherent optical field receiver 220.

Further, chromatic dispersion compensation in an incoherent optical field reconstruction format disclosed in WO 2007/132503 A1 may be used. In this case, the phase accumulation processing is performed in the incoherent optical field receiver 220, and a phase accumulation signal $r(t)\exp(j\Sigma\phi(t))$ transmitted through the optical fiber is reconstructed. Then, after a factor of the waveform degradation is equalized, a difference in the phase component is obtained again at the time intervals T, and a desired complex information signal $r(t)\exp(j\phi(t))$ is restored. Therefore, even if the accumulation of the phase error occurs in the incoherent optical field reconstruction format, the error is finally eliminated in the process of obtaining the difference in the phase component, thereby producing the same effect as that of this invention.

According to the second embodiment of this invention, by inserting the preequalization circuit for previously compensating an influence of linear degradation due to the chromatic dispersion or the like on the transmitting end, a non-linear phase compensation circuit for previously compensating an influence of non-linear phase rotation on the transmitting end, and the like, it is possible to cancel influences of such preequalization and the degradation of the transmission line, enabling the long-distance optical fiber transmission and making it possible to suppress an occurrence of the zero hit.

Further, optimal equalization is performed by varying the equalization amount of the preequalization circuit, and hence it is possible to realize an extension of the transmission distance and an improvement in performance. Further, the equalization amount is dynamically controlled to attain the best quality by using the signal quality information obtained from the optical field receiver, thereby making it possible to maintain an optimal reception state constantly.

(Third Embodiment)

Figure 11:
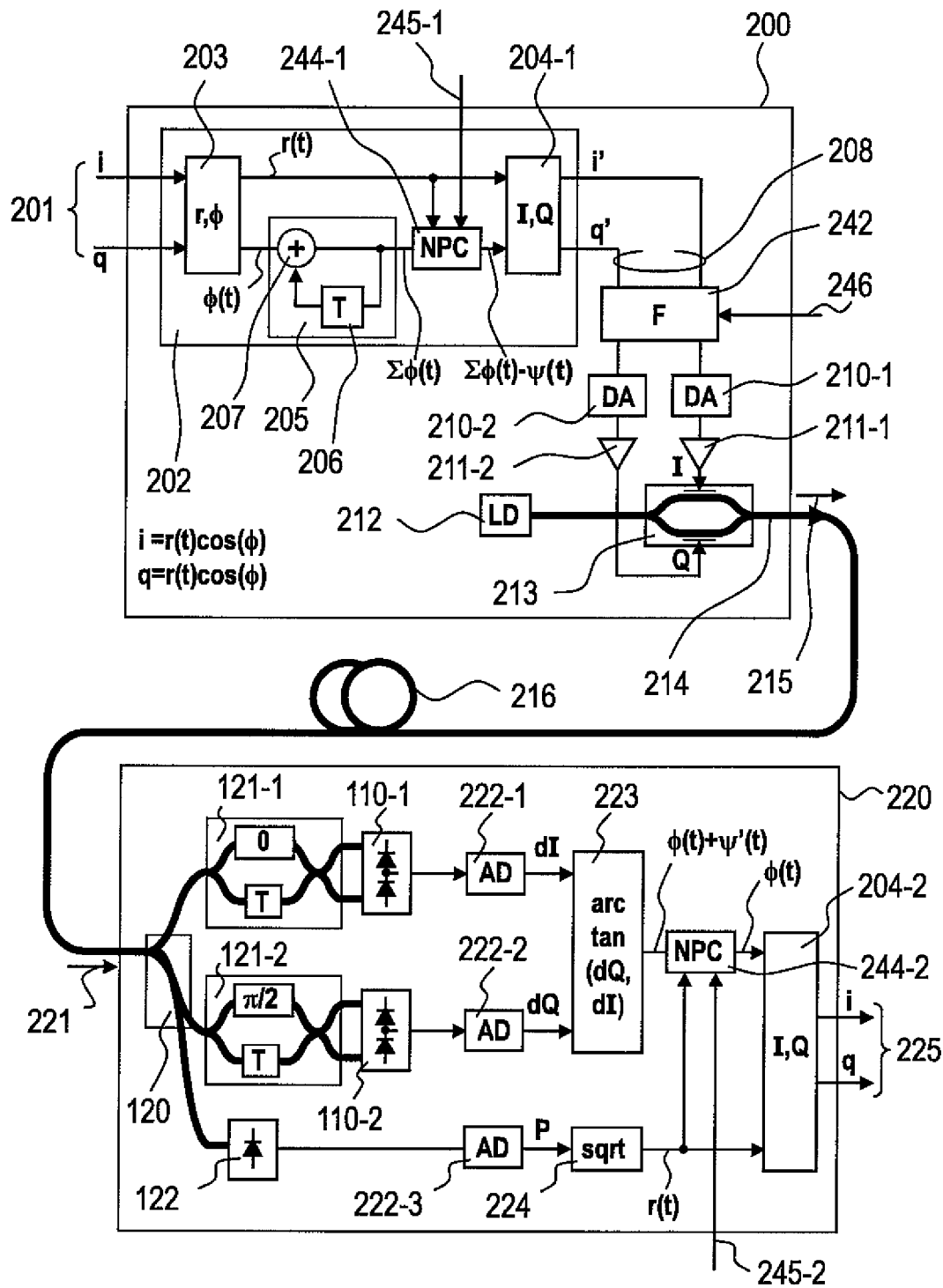
FIG. 11 is a configuration diagram of an optical field transmission system according to a third embodiment of this invention.

FIG. 11 is a configuration diagram of an optical field transmission system according to a third embodiment of this invention.

In the third embodiment of this invention, the optical field transmitter includes a non-linear phase compensation circuit 244-1 and a preequalization circuit 242. The third embodiment is different from the first embodiment described above in that the incoherent optical field receiver 220 includes a non-linear phase compensation circuit 244-2.

In the third embodiment, a sampling speed of the complex signal input to the complex information input terminal 201 is assumed to be, for example, 2 sample/symbol, in which the Nyquist theorem is already satisfied.

In the phase pre-accumulation circuit 202, the non-linear phase compensation circuit 244-1 is located along the path of the phase component $\phi(t)$ obtained by the splitting performed by the polar coordinate conversion circuit 203, and a compensation portion $\psi(t)$ of a non-linear phase is previously subtracted from a phase component $\Sigma\phi(t)$ of a transmitted signal. The amplitude information $r(t)$ on the signal is input to the non-linear phase compensation circuit 244-1, and a compensation amount C of the non-linear phase is variably set from external by a compensation amount control terminal 245-1. In the same manner, the preequalization circuit 242 is provided with a compensation amount control terminal 246.

Further, in the incoherent optical field receiver 220, the non-linear phase compensation circuit 244-2 is located along the path of the phase component $\phi(t)$ output from the inverse tangential operation circuit 223, and the compensation portion $\psi(t)$ of the non-linear phase is subtracted from a phase component $\Sigma\phi(t)+\psi'(t)$ distorted by a non-linear phase $\psi'(t)$. The amplitude information $r(t)$ on the received signal is input to the non-linear phase compensation circuit 244-2, and a compensation amount C' of the non-linear phase is variably set from external by a compensation amount control terminal 245-2.

The non-linear phase in the optical fiber transmission is a phenomenon that the optical signal is degraded when an intensity modulation component included in the optical signal and optical intensity noise emitted from a repeater or the like during the optical fiber transmission give an excess non-linear phase rotation to the phase component of the optical signal transmitted through a non-linear effect (self-phase modulation effect) provided to the optical fiber. A degradation amount of the optical signal is proportional to an intensity component $\{r(t)\}^2$ of the optical signal, and hence is compensated by the non-linear phase compensation circuits (244-1 and 244-2) located in the optical field transmitter 200 and the optical field receiver, respectively.

In this case, the non-linear phase compensation circuit 244-1 of the optical field transmitter 200 produces a high effect of compensating the degradation ascribable to an intensity change of the signal. Further, the non-linear phase compensation circuit 244-2 of the incoherent optical field receiver 220 produces a high effect of compensating non-linear phase noise caused by optical noise. Those produce a maximum effect when both are used at the same time, but only one thereof may be used as necessary.

It should be noted that the non-linear phase compensation circuit 244-1 and the non-linear phase compensation circuit 244-2 have the same function of compensating the non-linear phase, but are different to some extent in the format for compensating the non-linear phase. In other words, in the optical field transmitter 200, which compensates the non-linear phase itself, a compensation amount becomes $\psi(t)=C\cdot\{r(t)\}^2$. Further, in the incoherent optical field receiver 220, which needs to compensate a differential phase, the compensation amount becomes $\psi'(t)=C'(\{r(t)\}^2-\{r(t-T)\}^2)$.

The compensation amount C of the non-linear phase compensation circuit 244-1, the compensation amount C' of the non-linear phase compensation circuit 244-2, and the compensation amount of the preequalization circuit 242, which are described above, are set to fixed amounts. Further, the compensation amounts may be set from external as necessary. Further, the compensation amounts may be set by automatically controlling the compensation amount of the preequalization circuit 242 so as to attain the optimal signal quality by using error rate information and quality information obtained from the optical field receiver.

(Fourth Embodiment)

Figure 12:
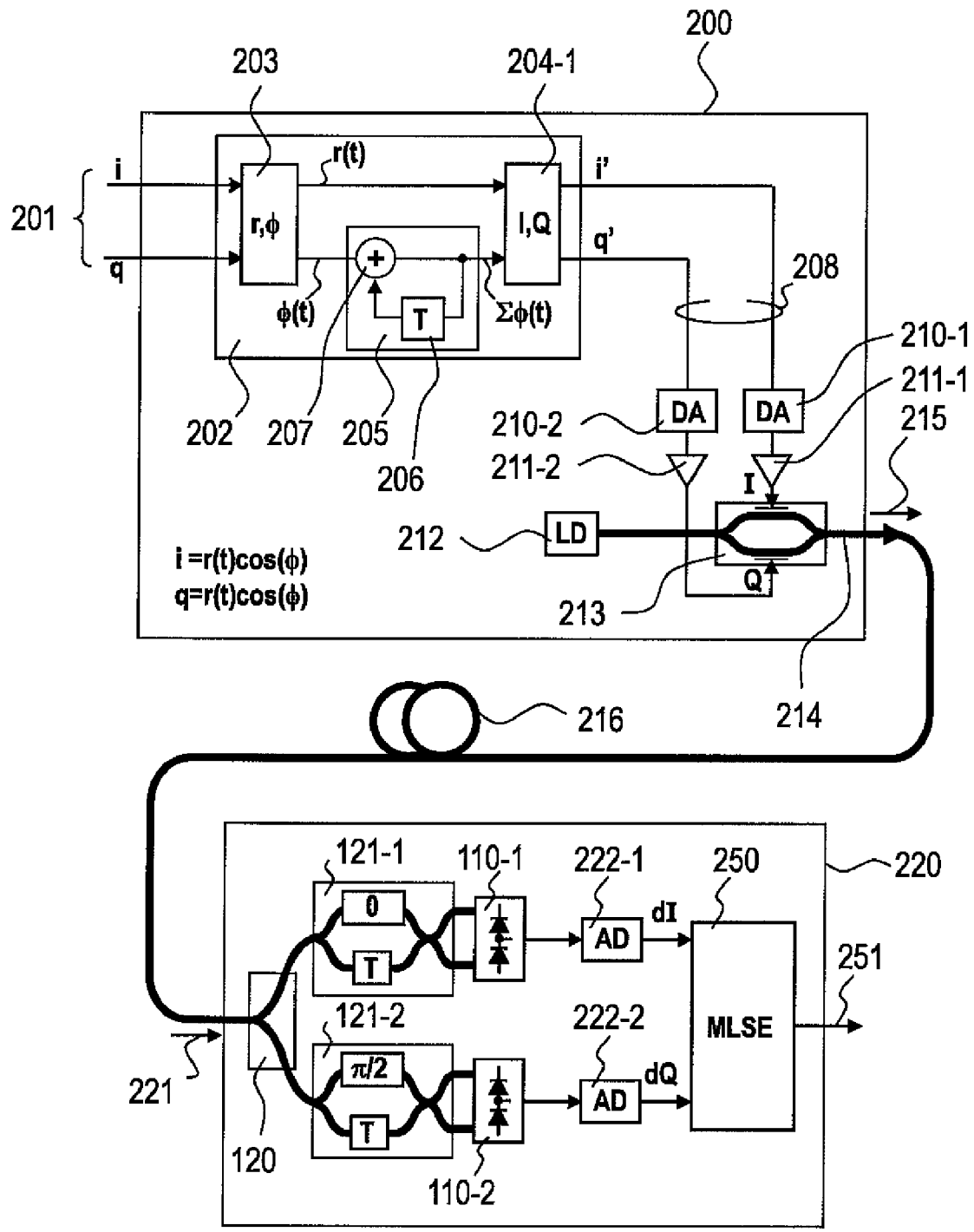
FIG. 12 is a configuration diagram of an optical field transmission system according to a fourth embodiment of this invention.

FIG. 12 is a configuration diagram of an optical field transmission system according to a fourth embodiment of this invention.

The fourth embodiment of this invention is different from the first embodiment in that the incoherent optical field receiver 220 includes a most likelihood sequence estimation (MLSE) circuit 250 as a kind of a symbol estimation circuit.

The output signals dI and dQ obtained from the AD converters 222-1 and 222-2 are input to the most likelihood sequence estimation circuit 250, and a most likely input data sequence is estimated by using past sample information. The estimated input data sequence is output as a data signal 251 in succession.

In the phase pre-accumulation processing according to this invention, the uncertainty of the initial phase of the signal input to the most likelihood sequence estimation circuit 250 is eliminated, and hence it becomes easy to apply the symbol estimation circuit such as the most likelihood sequence estimation circuit 250.

Further, in the case of using the most likelihood sequence estimation, the input data sequence is decided even if the original complex signal is not fully reconstructed, and hence, as illustrated in FIG. 12, the optical intensity receiver 122 can be omitted, which makes it possible to simplify the configuration of the optical receiver.

It should be noted that the number of samples necessary for the decision performed by the symbol estimation circuit depends upon over how long time interval the waveforms of the input signals interacted in the past. As the time during which the waveforms of the signals interacted becomes longer, the operation processing increases more sharply.

The complex signal having the signals dI and dQ as the real part and the imaginary part, respectively, is expressed as $r(t)r(t+T)\exp(j\phi(t))$, and hence the amplitude part exhibits past interaction performed over the time intervals T. Therefore, as described in the above-mentioned embodiments, the complex information $r(t)\exp(j\phi(t))$ is combined by the optical intensity receiver 122. By inputting the combined complex information to the most likelihood sequence estimation circuit 250, it becomes possible to reduce a necessary operation amount.

The fourth embodiment of this invention, in which the initial phase of the output signal becomes constant by the pre-accumulation of the phase component, can solve the problem that the initial phase is unknown in the optical field reconstruction format, and is effective for the case where the decision format such as the most likelihood sequence estimation (MLSE) is applied.

(Fifth Embodiment)

Figure 13:
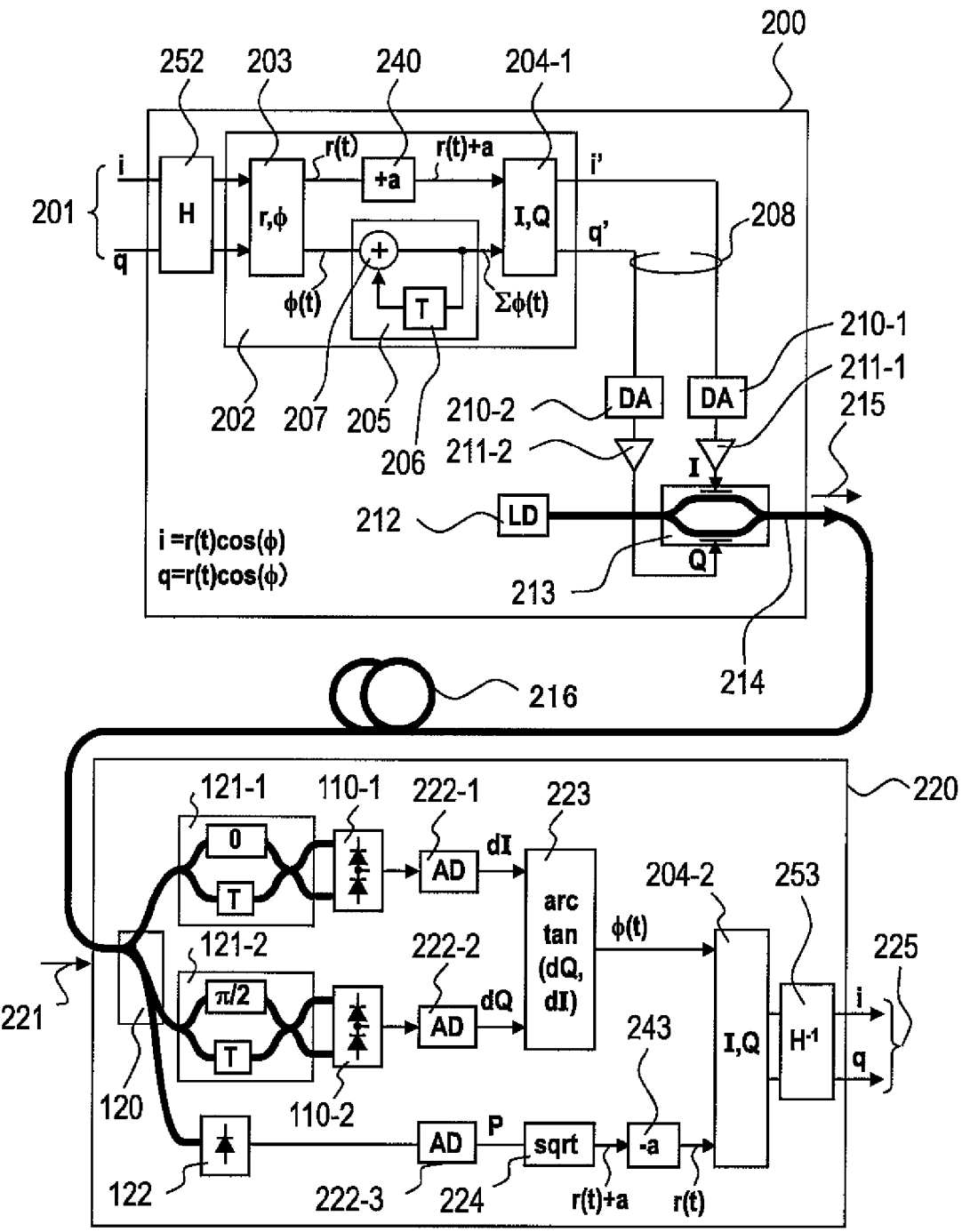
FIG. 13 is a configuration diagram of an optical field transmission system according to a fifth embodiment of this invention.

FIG. 13 is a configuration diagram of an optical field transmission system according to a fifth embodiment of this invention.

The fifth embodiment is configured so that the input complex information signal is converted into subcarrier modulation such as OFDM and then transmitted through the optical fiber. The fifth embodiment is different from the first embodiment in that the optical field transmitter 200 includes an OFDM conversion circuit 252 and that the incoherent optical field receiver 220 includes an OFDM inverse conversion circuit 253.

The OFDM conversion circuit 252 divides the complex information signal input from the complex information input terminal 201 into packets having a fixed length, performs multilevel modulation and Fourier transform for each packet, and converts the resultant signal into an OFDM signal by an FFT processing.

The OFDM signal is a combination of a plurality of carriers subjected to narrowband modulation, and is therefore a complex digital sample sequence from which an instantaneous waveform of the complex information signal is not predicted.

In the example of FIG. 13, after the phase component is accumulated in the optical field transmitter 200, the complex digital sample sequence is converted into the optical field, and the optical field obtained by the conversion is transmitted to the optical fiber. Upon reception of the transmitted optical field, the incoherent optical field receiver 220 can restore the original complex digital sample sequence, and can obtain the first complex information signal by using the OFDM inverse conversion circuit 253.

According to the fifth embodiment of this invention, a coherent receiver necessary for normal optical OFDM transmission becomes unnecessary, making it possible to simplify the configuration of the receiver.

It should be noted that the complex digital sample sequence output from the OFDM conversion circuit 252 has no clear symbol interval. In this case, by equalizing a sampling time Tsa and a phase accumulation time T (and the delay time Td of the optical delay detector of the optical field receiver) of the complex digital sample sequence, it is guaranteed that the same complex information as the original complex information is restored from the Cartesian coordinate conversion circuit 204-2 of the incoherent optical field receiver 220.

It should be noted that, in the inside of the incoherent optical field receiver, the sampling interval for AD conversion may be shortened as necessary, and the oversampling may be performed by using the frequency of an integral multiple.

Further, the above-mentioned problem of the zero hit occurs also in the fifth embodiment, but in general, no great influence is produced in subcarrier transmission such as OFDM even in a case where the phase information at one sample point is lost.

Therefore, the amplitude conversion circuit 240 and the amplitude inverse conversion circuit 243 are used in the example of FIG. 13, but are not necessarily provided. Further, if necessary, as described above, such a configuration is possible that the lost phase information is estimated from the sample points before/after that by causing the optical signal to be oversampled in the incoherent optical field receiver 220.

According to the fifth embodiment of this invention, in a case where this invention is applied to transmission of a complex field signal such as the optical OFDM transmission, it is possible to make the coherent reception unnecessary, thereby making it possible to reduce the size and costs of the receiver and achieve power savings.

What is claimed is:

1. An optical field transmitter comprising:
a light source;
one or more digital-analog converters; and
an optical field modulator, wherein:
the optical field transmitter modulates an information signal sampled at predetermined time intervals into an optical field signal and transmitting the optical field signal obtained by the modulation;

the information signal includes one of multilevel signals arranged irregularly on a complex plane and multilevel signals arranged by combining mutually different numbers of phase values in at least two amplitude values;

the optical field transmitter further comprises a phase pre-accumulation circuit for outputting phase pre-accumulation complex information obtained by previously accumulating a phase component of the information signal at predetermined time intervals;

the one or more digital-analog converters each converts the information signal including the output phase pre-accumulation complex information into an analog signal, and inputs the analog signal obtained by the conversion to the optical field modulator; and the optical field modulator modulates light output from the light source into the optical field signal by using the analog signal, and transmits the optical field signal obtained by the modulation.

2. The optical field transmitter according to claim 1, further comprising a coordinate conversion circuit for converting coordinate of the information signal so as to prevent an amplitude of the optical field signal after the modulation from becoming substantially zero.

3. The optical field transmitter according to claim 1, wherein the information signal further includes multilevel signals arranged at signal points having a positive amplitude value equal to or larger than a predetermined value in advance.

4. The optical field transmitter according to claim 1, further comprising a preequalization circuit located between the phase pre-accumulation circuit and the optical field modulator, wherein the preequalization circuit previously equalizes degradation of the optical field signal caused by any one of the optical field transmitter, an optical transmission line for transmitting therethrough the optical field signal transmitted from the optical field transmitter, and an optical field receiver for receiving the transmitted optical field signal.

5. The optical field transmitter according to claim 4, further comprising an oversampling circuit for oversampling the information signal to be input to the preequalization circuit by using a frequency of an integral multiple.

6. An optical field transmission system comprising an optical field transmitter and an optical field receiver, wherein:

the optical field transmitter comprises a light source, one or more digital-analog converters, and an optical field modulator; the optical field transmitter modulates an information signal sampled at predetermined time intervals into an optical field signal and transmitting the optical field signal obtained by the modulation;

the optical field receiver for receiving the optical field signal transmitted from the optical field transmitter;

the information signal includes one of: multilevel signals arranged irregularly on a complex plane; and multilevel signals arranged by combining mutually different numbers of phase values in at least two amplitude values;

the optical field transmitter further comprises a phase pre-accumulation circuit for outputting phase pre-accumulation complex information obtained by previously accumulating a phase component of the information signal at predetermined time intervals;

the one or more digital-analog converters each converts the information signal including the output phase pre-accumulation complex information into an analog signal, and inputs the analog signal obtained by the conversion to the optical field modulator;

the optical field modulator modulates light output from the light source into the optical field signal by using the analog signal, and transmits the optical field signal obtained by the modulation; and the optical field receiver comprises:
an optical splitter for splitting the received optical field signal into a plurality of optical signals comprising at least one first optical signal and one second optical signal;

a first optical delay detection receiver for delay-detecting the one first optical signal with a predetermined delay time, and converting the one first optical signal that has been delay-detected into a first electrical signal;

a second optical delay detection receiver for delay-detecting the one second optical signal with a predetermined delay time by a phase difference in which a phase thereof is shifted from a phase of the first optical delay detection receiver by 90 degrees, and converting the one second optical signal that has been optically-delay-detected into a second electrical signal; and a complex information combining circuit for receiving the first electrical signal and the second electrical signal input at the same timing.

7. The optical field transmission system according to claim 6, wherein:

the optical splitter further splits the received optical field signal into a third optical signal;

the optical field receiver further comprises an optical intensity receiver for receiving an intensity component of the third optical signal, and converting the received intensity component of the third optical signal into a third electrical signal;

the optical intensity receiver inputs the third electrical signal to the Cartesian coordinate conversion circuit at the same timing at which the first electrical signal and the second electrical signal are input; and the Cartesian coordinate conversion circuit calculates the phase component of the information signal from the first electrical signal and the second electrical signal, and calculates an intensity component of the information signal from the input third electrical signal or an amplitude component of the information signal from an amplitude of a square root of the input third electrical signal.

8. The optical field transmission system according to claim 6, wherein:

the optical field receiver further comprises analog-digital converters located after the first optical delay detection receiver and the second optical delay detection receiver, respectively; and each of the analog-digital converters performs sampling simultaneously in a predetermined cycle, and convert the analog signal into a digital signal.

9. The optical field transmission system according to claim 6, wherein:

the optical field transmitter further comprises a coordinate conversion circuit for converting coordinate of the information signal so as to prevent an amplitude of the optical field signal after the modulation from becoming substantially zero;

the optical field receiver further comprises an inverse coordinate conversion circuit; and the inverse coordinate conversion circuit performs an operation inverse to the coordinate conversion performed by the coordinate conversion circuit on a signal output from the Cartesian coordinate conversion circuit.

10. The optical field transmission system according to claim 6, wherein:

the optical field transmitter further comprises a preequalization circuit located between the phase pre-accumulation circuit and the optical field modulator; and the preequalization circuit previously equalizes degradation of the optical field signal caused by any one of the optical field transmitter, an optical transmission line for transmitting therethrough the optical field signal transmitted from the optical field transmitter, and the optical field receiver for receiving the transmitted optical field signal.

11. The optical field transmission system according to claim 10, wherein the optical field transmission system obtains quality information on a signal from the optical field receiver, and changes an amount to be equalized by the preequalization circuit based on the acquired quality information on the signal.

* * * * *